United States Patent
Jung et al.

(10) Patent No.: US 11,323,971 B2
(45) Date of Patent: May 3, 2022

(54) METHOD FOR TRANSMITTING AND RECEIVING SYSTEM INFORMATION IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Heung Mook Kim, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 16/636,901

(22) PCT Filed: Aug. 3, 2018

(86) PCT No.: PCT/KR2018/008861
§ 371 (c)(1),
(2) Date: Feb. 5, 2020

(87) PCT Pub. No.: WO2019/050165
PCT Pub. Date: Mar. 14, 2019

(65) Prior Publication Data
US 2020/0213960 A1  Jul. 2, 2020

(30) Foreign Application Priority Data

Sep. 6, 2017 (KR) .................. 10-2017-0114136
Sep. 12, 2017 (KR) .................. 10-2017-0116754
Nov. 21, 2017 (KR) .................. 10-2017-0155569

(51) Int. Cl.
*H04L 27/26* (2006.01)
*H04W 56/00* (2009.01)
(Continued)

(52) U.S. Cl.
CPC ....... *H04W 56/001* (2013.01); *H04W 72/005* (2013.01); *H04W 72/042* (2013.01); *H04W 72/1257* (2013.01)

(58) Field of Classification Search
None
See application file for complete search history.

(56) References Cited

U.S. PATENT DOCUMENTS 10,716,079 B2 * 7/2020 Jung .................. H04L 5/005
2017/0111886 A1 4/2017 Kim et al.
(Continued)

FOREIGN PATENT DOCUMENTS

WO 2017/196083 A1 11/2017
WO 2018/008981 A1 1/2018

OTHER PUBLICATIONS

HTC, "Configuration for Search Spaces and Control Resource Sets", R1-1708538, 3GPP TSG RAN WG1 Meeting #89, Hangzhou, P.R. China, May 5, 2017.
(Continued)

*Primary Examiner* — Sithu Ko
(74) *Attorney, Agent, or Firm* — Rabin & Berdo, P.C.

(57) ABSTRACT

A method for transmitting and receiving system information in a communication system is disclosed. An operation method of a UE comprises the steps of: checking minimum system information included in an SS/PBCH block received from a base station; receiving a PDCCH in a control resource set indicated by the minimum system information; checking a time-frequency resource through which a PDSCH including RMSI is to be transmitted, on the basis of scheduling information included in the PDCCH; and acquiring the RMSI from the PDSCH received in the time-frequency resource. Therefore, the performance of the communication system can be improved.

18 Claims, 21 Drawing Sheets

(51) Int. Cl.
*H04W 72/00* (2009.01)
*H04W 72/04* (2009.01)
*H04W 72/12* (2009.01)

(56) References Cited

U.S. PATENT DOCUMENTS

| | | | |
|---|---|---|---|
| 2017/0188343 A1 | 6/2017 | Nguyen et al. | |
| 2017/0311276 A1 | 10/2017 | Tsai et al. | |
| 2017/0353254 A1 | 12/2017 | Islam et al. | |
| 2017/0359791 A1 | 12/2017 | Onggosanusi et al. | |
| 2018/0192383 A1* | 7/2018 | Nam | H04J 11/00 |
| 2018/0279135 A1* | 9/2018 | Hwang | H04L 5/0094 |
| 2018/0288749 A1* | 10/2018 | Sun | H04L 5/0048 |
| 2018/0324678 A1* | 11/2018 | Chen | H04W 48/16 |
| 2018/0376511 A1* | 12/2018 | Tsai | H04L 5/0053 |
| 2019/0021119 A1* | 1/2019 | Ng | H04W 48/10 |
| 2019/0028315 A1* | 1/2019 | Park | H04L 27/2657 |
| 2019/0182016 A1* | 6/2019 | Guo | H04L 5/0053 |
| 2019/0229867 A1* | 7/2019 | Yi | H04L 5/0048 |
| 2020/0036497 A1* | 1/2020 | Xu | H04W 72/0446 |
| 2020/0120680 A1* | 4/2020 | Hwang | H04L 5/0053 |

OTHER PUBLICATIONS

Intel Corporation, "Remaining System Information Delivery Mechanisms", R1-1707340, 3GPP TSG RAN WG1 Meeting RAN1 #89, Hangzhou, P.R. China, May 7, 2017.

Mediatek Inc., "Discussion on CORESET Configurations", R1-1713675, 3GPP TSG RAN WG1 Meeting #90, Prague, Czech Republic, Aug. 12, 2017.

Qualcomm Incorporated, "Remaining System Information Delivery Consideration", R1-1713376, 3GPP TSG-RAN WG1 NR#90, Prague, Czech Republic, Aug. 12, 2017.

ZTE, "RMSI Delivery", R1-1712061, 3GPP TSG RAN WG1 Meeting #90, Prague, Czechia, Aug. 11, 2017.

* cited by examiner

METHOD FOR TRANSMITTING AND RECEIVING SYSTEM INFORMATION IN COMMUNICATION SYSTEM

TECHNICAL FIELD

The present invention relates to a method for transmitting and receiving system information, and more particularly, to a method for transmitting and receiving system information (e.g., minimum system information, remaining minimum system information (RMSI), other system information (OSI)) in a fifth generation (5G) communication system.

BACKGROUND ART

With the development of information and communication technology, various wireless communication technologies are being developed. Typical wireless communication technologies include long term evolution (LTE), new radio (NR), or the like defined as the 3rd generation partnership project (3GPP) standard. The LTE may be one of 4th generation (4G) wireless communication technologies, and the NR may be one of 5th generation (5G) wireless communication technologies.

A 5G communication system (e.g., communication system supporting the NR) using a frequency band (e.g., frequency band above 6 GHz) higher than a frequency band (e.g., frequency band below 6 GHz) of a 4G communication system (e.g., communication system supporting the LTE) as well as the frequency band of the 4G communication system has been considered for processing of wireless data which has rapidly increased since commercialization of the 4G communication system. The 5G communication system can support Enhanced Mobile Broadband (eMBB), Ultra-Reliable and Low-Latency Communication (URLLC), and massive Machine Type Communication (mMTC).

In order to support the services (e.g., eMBB, URLLC, mMTC, etc.) described above in the 5G communication system, a base station may transmit multiplexed channels and signals to a plurality of user equipments (UEs). System information may be classified into minimum system information, remaining minimum system information (RMSI), and other system information (OSI). Since a transmission channel and a transmission scheme are configured differently according to the type of system information, methods for efficiently transmitting and receiving system information are needed.

Meanwhile, the technology as the background of the invention is intended to enhance understanding of the background of the invention, and may include contents that are not known to the person of ordinary skill in the art.

DISCLOSURE

Technical Problem

The objective of the present invention to solve the above-described problem is to provide a method for transmitting and receiving system information in a communication system.

Technical Solution

An operation method of a UE, according to a first embodiment of the present invention for achieving the above-described objective, may comprise identifying minimum system information included in an SS/PBCH block received from a base station; receiving a PDCCH in a control resource set indicated by the minimum system information; identifying a time-frequency resource through which a PDSCH including RMSI is transmitted based on scheduling information included in the PDCCH; and obtaining the RMSI from the PDSCH received in the time-frequency resource, wherein the minimum system information includes an index of a starting symbol of the control resource set in time axis.

Here, the minimum system information may further include information indicating a length of the control resource set in time axis, and the length of the control resource set may correspond to a length of one symbol, two symbols, or three symbols.

Here, the minimum system information may further include information indicating a size of the control resource set in frequency axis and an offset between a reference position and a starting position of the control resource set in frequency axis.

Here, each of the size and the offset of the control resource set in the frequency axis may be configured in units of resource block.

Here, the minimum system information may further include information indicating a subcarrier spacing applied to each of the PDCCH and the PDSCH.

Here, the PDCCH may be configured according to an aggregation level of CCE, and the PDCCH may include one or more CCEs.

Here, the PDCCH may include one or more CCEs, and a starting CCE among the one or more CCEs included in the PDCCH may be configured differently for each UE belonging to a cell of the base station.

Here, the control resource set may be multiplexed with the SS/PBCH block in frequency axis, the PDSCH may be multiplexed with the SS/PBCH block in frequency axis, and a sum of a length of the control resource set and a length of the PDSCH in time axis may be equal to a length of the SS/PBCH block in time axis.

Here, a starting position of the control resource set in time axis may be equal to a starting position of the SS/PBCH block in time axis, and an ending position of the PDSCH in time axis may be equal to an ending position of the SS/PBCH block in time axis.

Here, the control resource set may be multiplexed with the SS/PBCH block in time axis, the PDSCH may be multiplexed with the SS/PBCH block in frequency axis, and a length of the PDSCH in time axis may be equal to a length of the SS/PBCH block in time axis.

Here, the control resource set may be multiplexed with the SS/PBCH block in time axis, and the PDSCH may be multiplexed with the SS/PBCH block in time axis.

An operation method of a base station, according to a second embodiment of the present invention for achieving the above-described objective, may comprise generating a PDSCH including RMSI; generating a PDCCH including scheduling information for the PDSCH; generating an SS/PBCH block including minimum system information indicating a control resource set through which the PDCCH is transmitted; and transmitting the SS/PBCH block, the PDCCH, and the PDSCH, wherein the minimum system information includes an index of a starting symbol of the control resource set in time axis.

Here, the minimum system information may further include information indicating a length of the control resource set in time axis, and the length of the control resource set may correspond to a length of one symbol, two symbols, or three symbols.

Here, the minimum system information may further include information indicating a size of the control resource set in frequency axis and an offset between a reference position and a starting position of the control resource set in frequency axis.

Here, the minimum system information may further include information indicating a subcarrier spacing applied to each of the PDCCH and the PDSCH.

Here, the PDCCH may be configured according to an aggregation level of CCE, and the PDCCH may include one or more CCEs.

Here, the control resource set may be multiplexed with the SS/PBCH block in frequency axis, the PDSCH may be multiplexed with the SS/PBCH block in frequency axis, and a sum of a length of the control resource set and a length of the PDSCH in time axis may be equal to a length of the SS/PBCH block in time axis.

Here, a starting position of the control resource set in time axis may be equal to a starting position of the SS/PBCH block in time axis, and an ending position of the PDSCH in time axis may be equal to an ending position of the SS/PBCH block in time axis.

Here, the control resource set may be multiplexed with the SS/PBCH block in time axis, the PDSCH may be multiplexed with the SS/PBCH block in frequency axis, and a length of the PDSCH in time axis may be equal to a length of the SS/PBCH block in time axis.

Here, the control resource set may be multiplexed with the SS/PBCH block in time axis, and the PDSCH may be multiplexed with the SS/PBCH block in time axis.

Advantageous Effects

According to the present invention, the base station can transmit a synchronization signal/physical broadcast channel (SS/PBCH) block including minimum system information indicating a control resource set, transmit a physical control channel (PDCCH) including scheduling information for a physical downlink shared channel (PDSCH) including remaining minimum system information (RMSI) in the control resource set indicated by the minimum system information, and transmit the PDSCH including the RMSI in time-frequency resources indicated by the scheduling information.

In this case, the user equipment (UE) can identify the location of the control resource set based on the minimum system information included in the SS/PBCH block received from the base station, receive the PDCCH in the identified control resource set, receive the PDSCH in the time-frequency resources indicated by the scheduling information included in the received PDCCH, and identify the RMSI included in the received PDSCH.

Therefore, transmission and reception procedures of system information can be efficiently performed in the communication system, and the performance of the communication system can be improved.

MODES OF THE INVENTION

Figure 1:
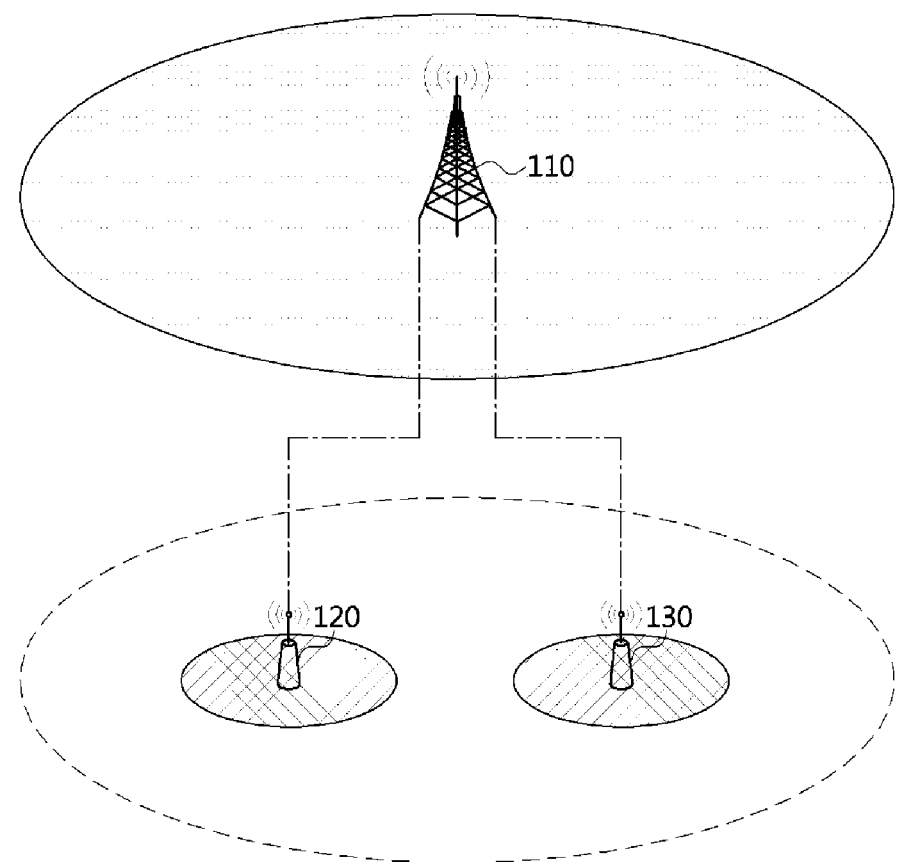
FIG. 1 is a conceptual diagram illustrating a first embodiment of a wireless communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A wireless communication network to which embodiments according to the present invention are applied will be described. The wireless communication network to which the embodiments according to the present invention are applied is not limited to the following description, and the embodiments according to the present invention can be applied to various wireless communication networks. Here, the wireless communication network may be used in the same sense as a wireless communication system.

FIG. 1 is a conceptual diagram illustrating a first embodiment of a wireless communication network.

Referring to FIG. 1, a first base station 110 may support a cellular communication (e.g., long term evolution (LTE), LTE-advance (LTE-A), new radio (NR), etc. specified in the $3^{rd}$ generation partnership project (3GPP)), or the like. The first base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like.

The first base station 110 may operate in a frequency band F1 and may form a macro cell. The first base station 110 may be connected to another base station (e.g., second base station 120, third base station 130, etc.) through an ideal backhaul or a non-ideal backhaul. The second base station 120 may be located within the coverage of the first base station 110. The second base station 120 may operate in a frequency band F2 and may form a small cell. The communication scheme (e.g., NR) supported by the second base station 120 may be different from the communication scheme of the first base station 110 (e.g., LTE).

The third base station 130 may be located within the coverage of the first base station 110. The third base station 130 may operate in the frequency band F2 and may form a small cell. The communication scheme (e.g., NR) supported by the third base station 120 may be different from the communication scheme of the first base station 110 (e.g., LTE). Each of the first base station 110 and a user equipment (UE) (not shown) connected to the first base station 110 may transmit and receive signals through a carrier aggregation (CA) between the frequency band F1 and the frequency band F2. Alternatively, each of the UE connected to the first base station 110 and the first base station 110 may support dual-connectivity (DC) for the frequency band F1 and the frequency band F2, and may transmit and receive signals in the DC environment.

The communication node (i.e., base station, UE, etc.) constituting the wireless communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, an evolved Node B, a 5G Node B (gNodeB), a base transceiver station (BTS), a radio base station, a radio transceiver, an access point, an access node, a transmission/reception point (Tx/Rx Point), or the like. Among the communication nodes, the UE may be referred to as a terminal, an access terminal, a mobile terminal, a station, a subscriber station, a portable subscriber station, a mobile station, a node, a device, or the like. The communication node may have the following structure.

Figure 2:
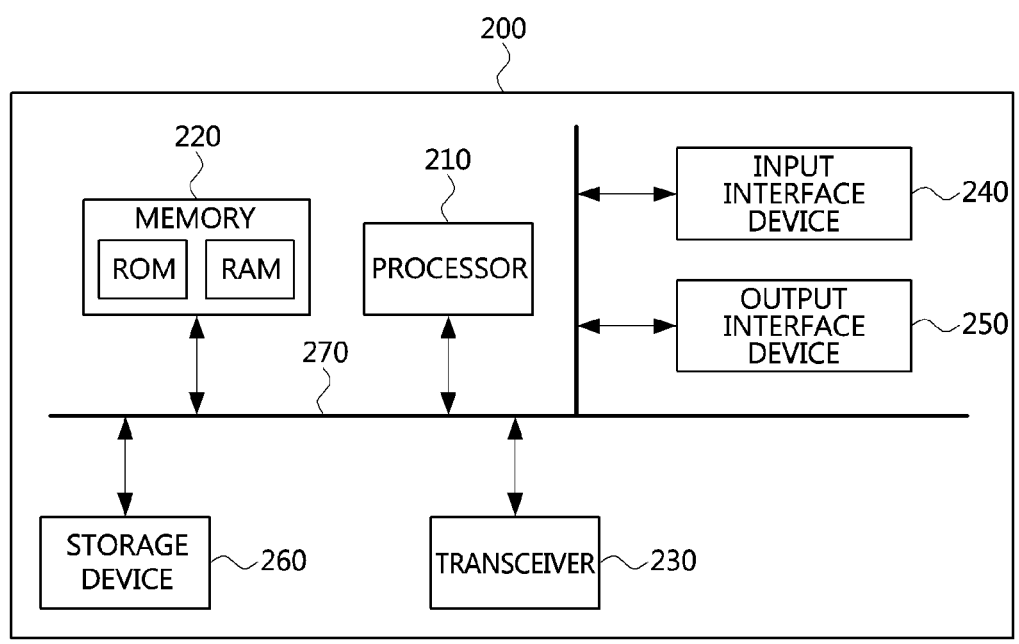
FIG. 2 is a block diagram illustrating a first embodiment of a communication node constituting a wireless communication network.

FIG. 2 is a block diagram illustrating a first embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Next, operation methods of a communication node in a wireless communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE is described, a corresponding base station may perform an operation corresponding to the operation of the UE. Conversely, when an operation of the base station is described, the corresponding UE may perform an operation corresponding to the operation of the base station.

Figure 3:
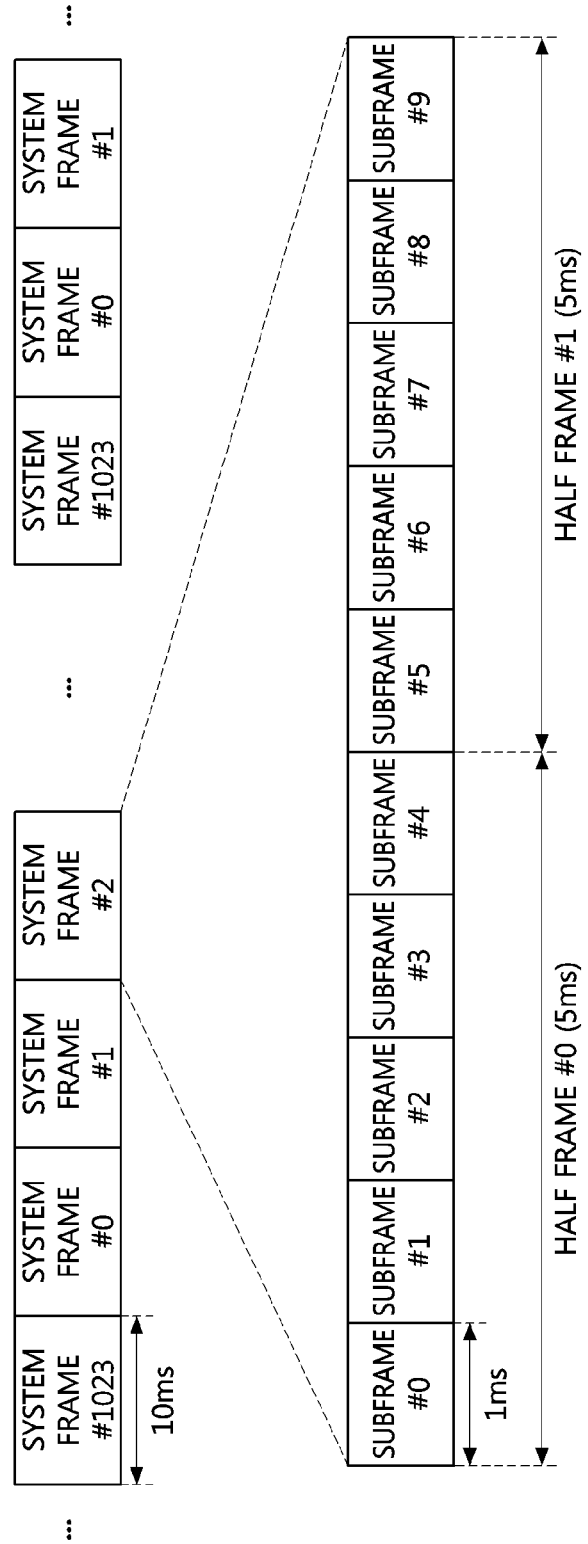
FIG. 3 is a conceptual diagram illustrating a first embodiment of a system frame configuration in a wireless communication network.

FIG. 3 is a conceptual diagram illustrating a first embodiment of a system frame configuration in a wireless communication network.

Referring to FIG. 3, time resources in a wireless communication network may be divided into frames. For example, system frames each of which has a length of 10 milliseconds (ms) may be configured consecutively in the time axis of the wireless communication network. System frame numbers (SFNs) may set to #0 to #1023. In this case, 1024 system frames may be repeated in the time axis of the wireless communication network. For example, an SFN of a system frame after the system frame #1023 may be set to #0. One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
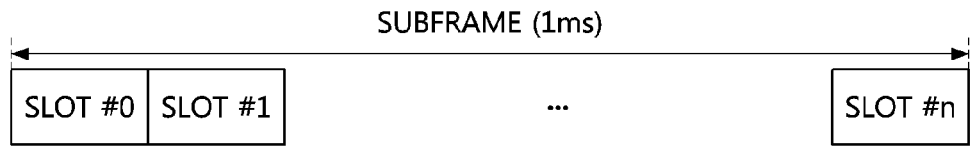
FIG. 4 is a conceptual diagram illustrating a first embodiment of a subframe configuration in a wireless communication network.

FIG. 4 is a conceptual diagram illustrating a first embodiment of a subframe configuration in a wireless communication network.

Referring to FIG. 4, one subframe may include n slots, and n may be an integer of 1 or more. Accordingly, one subframe may be composed of one or more slots.

Figure 5:
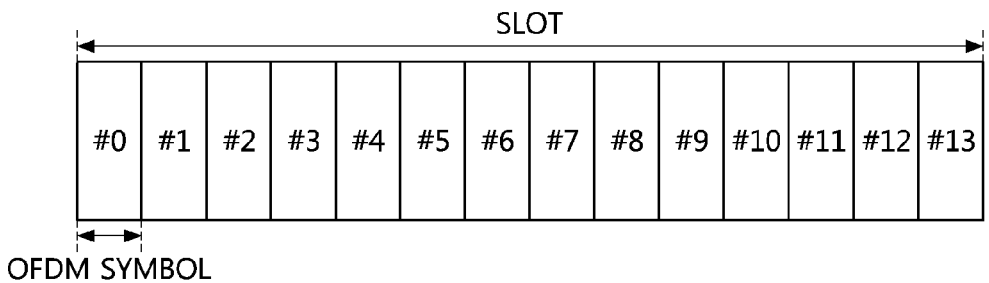
FIG. 5 is a conceptual diagram illustrating a first embodiment of a slot configuration in a wireless communication network.

FIG. 5 is a conceptual diagram illustrating a first embodiment of a slot configuration in a wireless communication network.

Referring to FIG. 5, one slot may comprise one or more OFDM symbols. For example, one slot may be composed of 14 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 6:
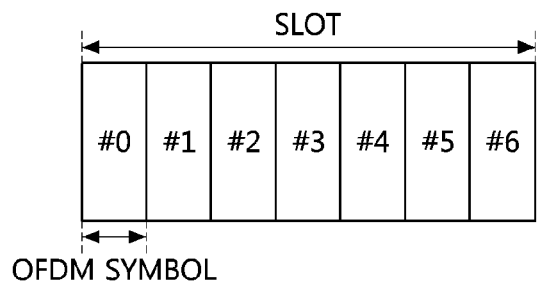
FIG. 6 is a conceptual diagram illustrating a second embodiment of a slot configuration in a wireless communication network.

FIG. 6 is a conceptual diagram illustrating a second embodiment of a slot configuration in a wireless communication network.

Referring to FIG. 6, one slot may comprise 7 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 7:
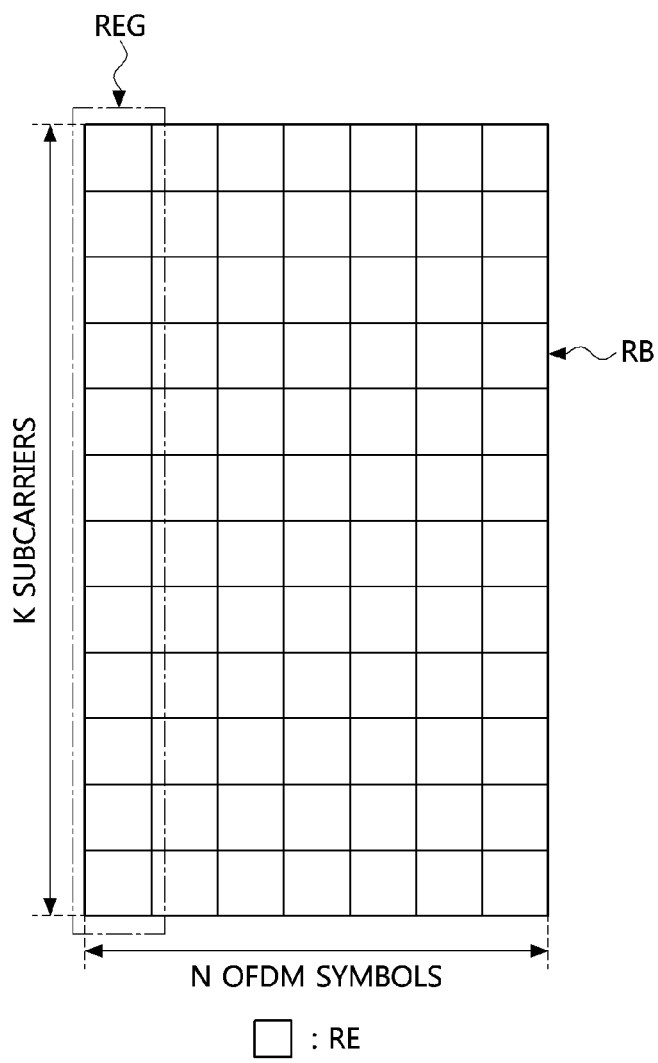
FIG. 7 is a conceptual diagram illustrating a first embodiment of time-frequency resources in a wireless communication network.

FIG. 7 is a conceptual diagram illustrating a first embodiment of time-frequency resources in a wireless communication network.

Referring to FIG. 7, a resource configured with one OFDM symbol in the time axis and one subcarrier in the frequency axis may be defined as a 'resource element (RE)'. Resources configured with one OFDM symbol in the time axis and K subcarriers in the frequency axis may be defined as a 'resource element group (REG)'. One REG may include K REs. Here, K may be 12. Resources configured with N OFDM symbols in the time axis and K subcarriers in the frequency axis may be defined as a 'resource block (RB)'. Here, N may be 6, 7, or 14. The RB may be used as a basic unit of data resource allocation.

Figure 8:
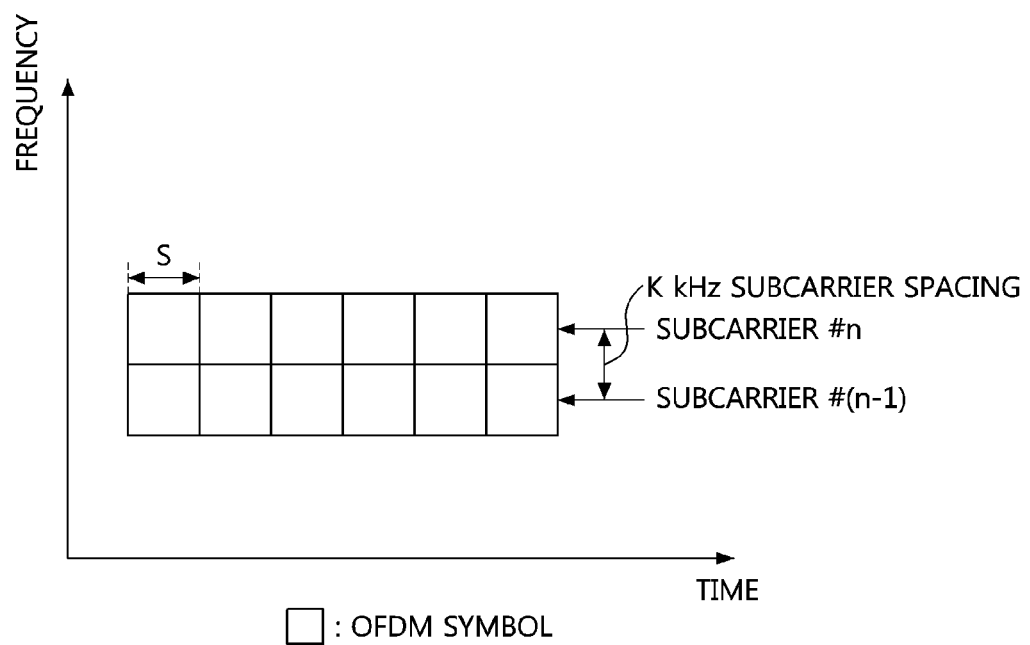
FIG. 8 is a conceptual diagram illustrating a first embodiment of time-frequency resources according to a subcarrier spacing in a wireless communication network.
Figure 9:
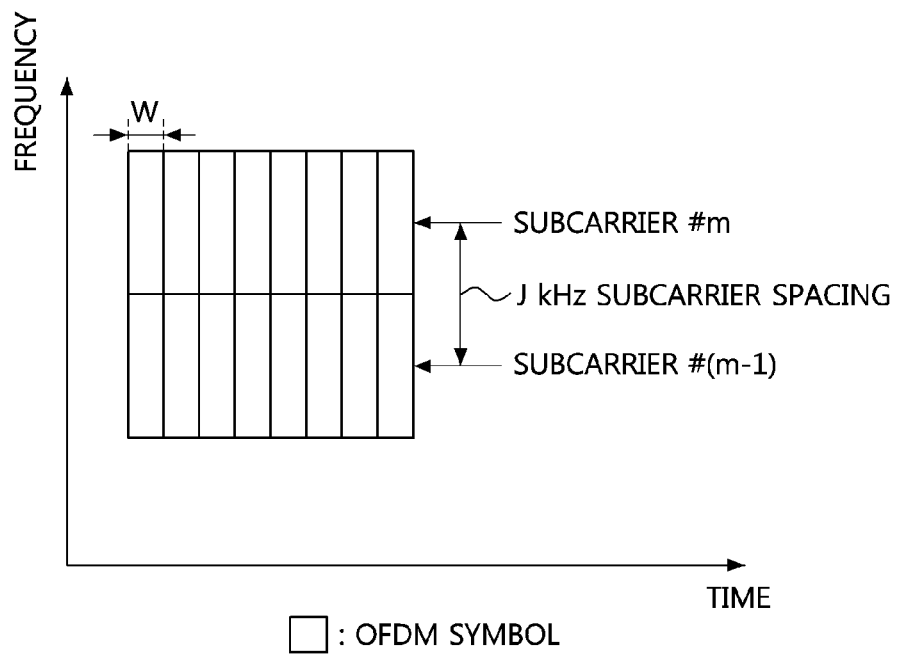
FIG. 9 is a conceptual diagram illustrating a second embodiment of time-frequency resources according to a subcarrier spacing in a wireless communication network.

FIG. 8 is a conceptual diagram illustrating a first embodiment of time-frequency resources according to a subcarrier spacing in a wireless communication network, and FIG. 9 is a conceptual diagram illustrating a second embodiment of time-frequency resources according to a subcarrier spacing in a wireless communication network.

Referring to FIG. 8, in a wireless communication network in which a K kHz subcarrier spacing is used, the length of one OFDM symbol may be S ms. Referring to FIG. 9, in a wireless communication network in which a J kHz subcarrier spacing is used, the length of one OFDM symbol may be W ms. When the subcarrier spacing J kHz is twice the subcarrier spacing K kHz (i.e., J=2K), the length of the OFDM symbol (i.e., W ms) in FIG. 9 may be half the length of the OFDM symbol (i.e., S ms) in FIG. 8. In this case, W=S/2.

In the wireless communication network, the subcarrier spacing may be variably configured. For example, in a wireless communication network in which a 15 kHz subcarrier spacing is used, the length of the OFDM symbol may be $1/15000$ second (s). In this case, the length of one slot composed of 7 OFDM symbols shown in FIG. 6 may be $7/15000$ s.

Figure 10:
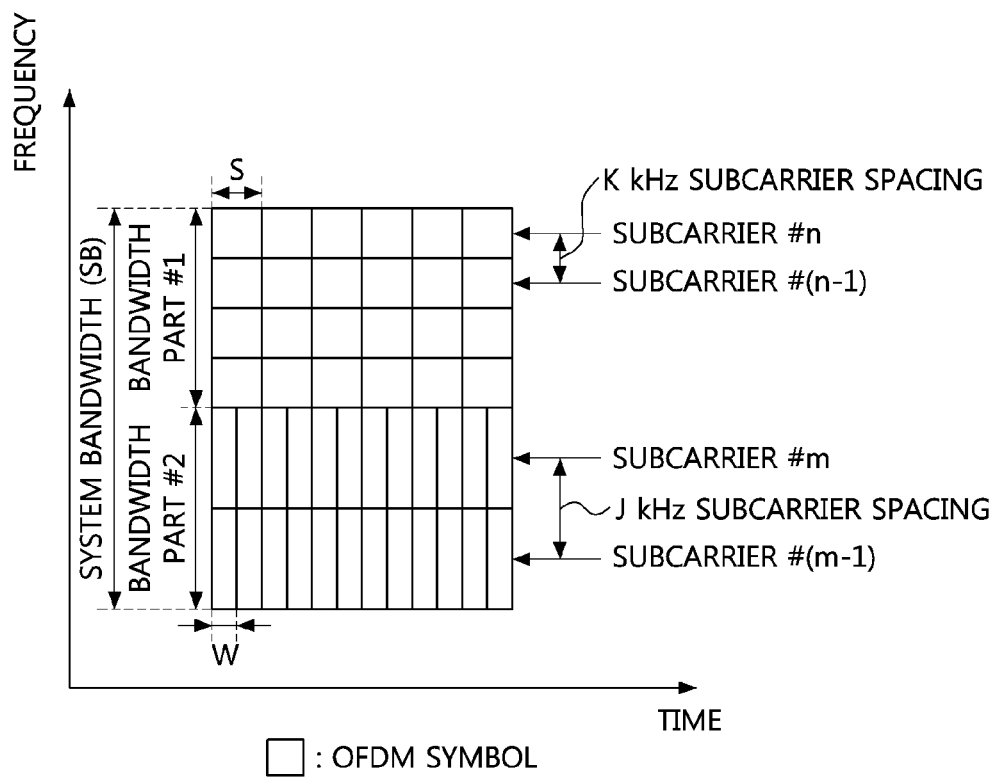
FIG. 10 is a conceptual diagram illustrating a first embodiment of a bandwidth part configuration in a wireless communication network.

FIG. 10 is a conceptual diagram illustrating a first embodiment of a bandwidth part configuration in a wireless communication network.

Referring to FIG. 10, a system bandwidth SB may include one or more bandwidth parts. For example, the system bandwidth SB may include a bandwidth part #1 and a bandwidth part #2. A subcarrier spacing of the bandwidth part #1 may be different from a subcarrier spacing of the bandwidth part #2. The subcarrier spacing of the bandwidth part #1 may be K kHz, in which case the base station and the UE may perform communications based on numerology according to the subcarrier spacing K kHz. The subcarrier spacing of the bandwidth part #2 may be J kHz, in which case the base station and the UE may perform communications based on numerology according to the subcarrier spacing J kHz.

The UE may transmit and receive signals in the entire system bandwidth SB or in some of the system bandwidth (SB) depending on its capability. For example, a UE capable of transmitting and receiving signals in the entire system bandwidth (SB) may be configure to transmit and receive signals in the bandwidth part #1, the bandwidth part #2, or the entire system bandwidth SB (e.g., bandwidth parts #1 and #2). A UE capable of transmitting and receiving signals in some of the system bandwidth SB may be configured to transmit and receive signals in the bandwidth part #1 or the bandwidth part #2.

Figure 11:
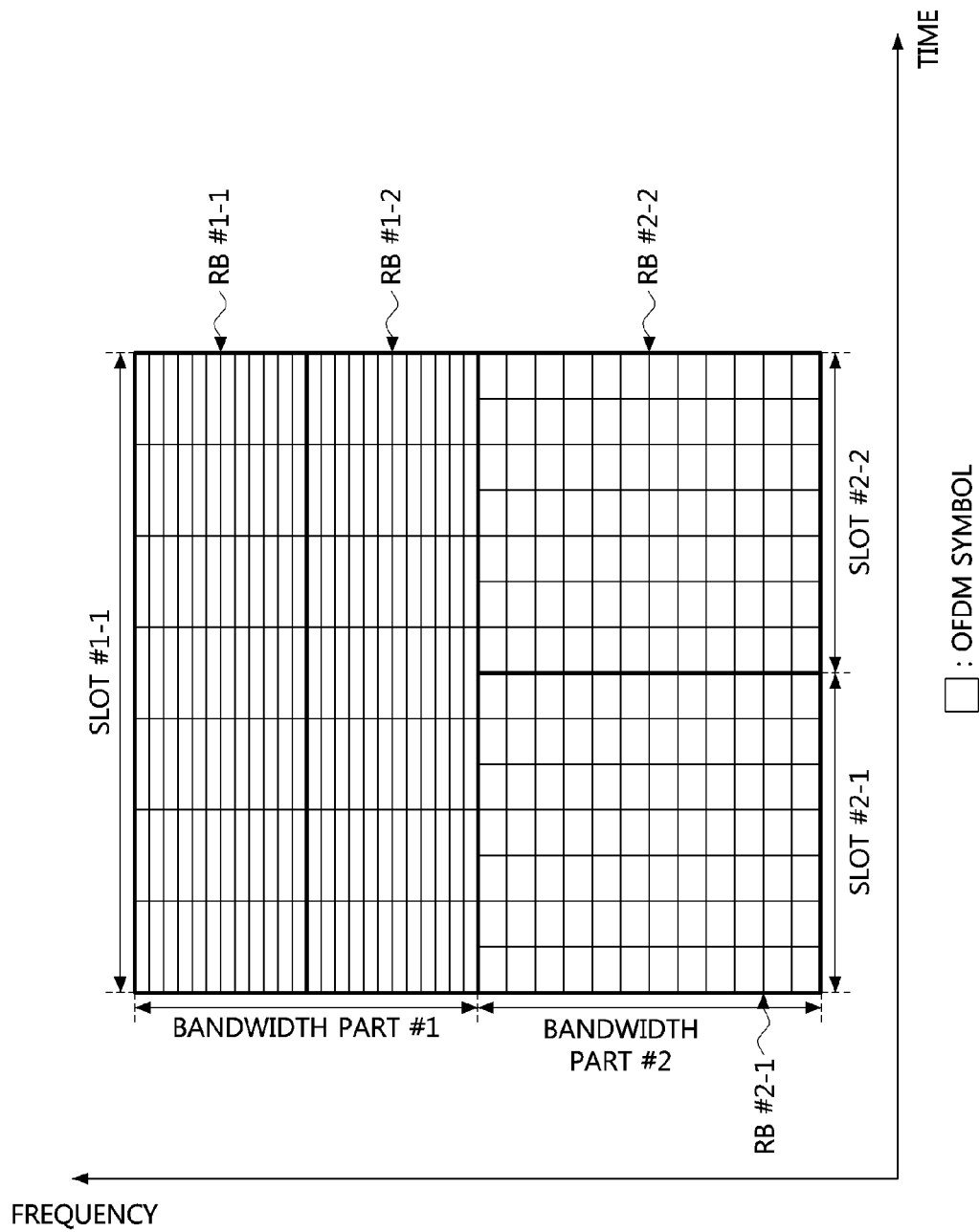
FIG. 11 is a conceptual diagram illustrating a third embodiment of time-frequency resources according to a subcarrier spacing in a wireless communication network.

FIG. 11 is a conceptual diagram illustrating a third embodiment of time-frequency resources according to a subcarrier spacing in a wireless communication network.

Referring to FIG. 11, a subcarrier spacing of a bandwidth part #1 may be different from a subcarrier spacing of a bandwidth part #2. For example, the subcarrier spacing of the bandwidth part #2 may be twice the subcarrier spacing of the bandwidth part #1. The slot may be defined regardless of the subcarrier spacing. For example, one slot may be composed of 7 OFDM symbols regardless of the length of the OFDM symbol. In this case, in the same time period, one slot (e.g., slot #1-1) may be configured in the bandwidth part #1, and two slots (e.g., slot #2-1 and slot #2-2) may be configured in the bandwidth part #2. Also, the RB may be configured with one slot in the time axis and 12 subcarriers in the frequency axis regardless of the subcarrier spacing. In this case, in the same sized time-frequency resources, two RBs (e.g., RB #1-1 and RB #1-2) may be configured in the frequency axis in the bandwidth part #1 and two RBs (e.g., RB #2-1 and RB #2-2) may be configured in the time axis in the bandwidth part #2.

Meanwhile, in a wireless communication network, a slot may comprise 14 symbols, and a mini-slot may comprise 2, 4, or 7 symbols. The type of slot may be classified into a downlink (DL) slot, an uplink (UL) slot, and a DL/UL slot. A slot comprising only symbols used for downlink transmission may be referred to as a 'DL slot', and a slot comprising only symbols used for uplink transmission may be referred to as a 'UL slot'. A symbol used for downlink transmission may be referred to as a 'DL symbol', and a symbol used for uplink transmission may be referred to as a 'UL symbol'. A slot comprising at least one DL slot, at least one flexible symbol and at least one UL symbol may be referred to as a 'DL/UL slot'. The flexible symbol may be a symbol whose use (e.g., downlink transmission or uplink transmission) is not determined. The flexible symbol may be used for downlink transmission (i.e., DL symbol) or uplink transmission (i.e., UL symbol) depending on configuration of the base station. Alternatively, no signal may be transmitted in the flexible symbol. Here, the flexible symbol may be referred to as an 'unknown symbol', a 'gap symbol', or a 'reserved symbol'.

Next, a configuration of control channel in the wireless communication network will be described. The base station may transmit downlink channel/signal to the UE. The downlink channel may include a data channel including data to be transmitted to the UE and a control channel including control information needed for transmission and reception of the data channel. For example, the control information may include information indicating a time-frequency resource of the data channel, information indicating a modulation and coding scheme (MCS) applied to the data channel, and the like. The UE may first perform detection/demodulation/decoding operations on the control channel to demodulate the data channel.

In addition, the base station may transmit not only control information needed for transmission and reception of a data channel but also information (e.g., system information) needed for communication with the base station through a control channel. The UE may detect a control channel by monitoring a search space, obtain information included in the control channel by demodulating and decoding the control channel, and operate based on the obtained information. For example, the UE may perform reception/demodulation/decoding operations on a data channel based on the obtained information.

Figure 12:
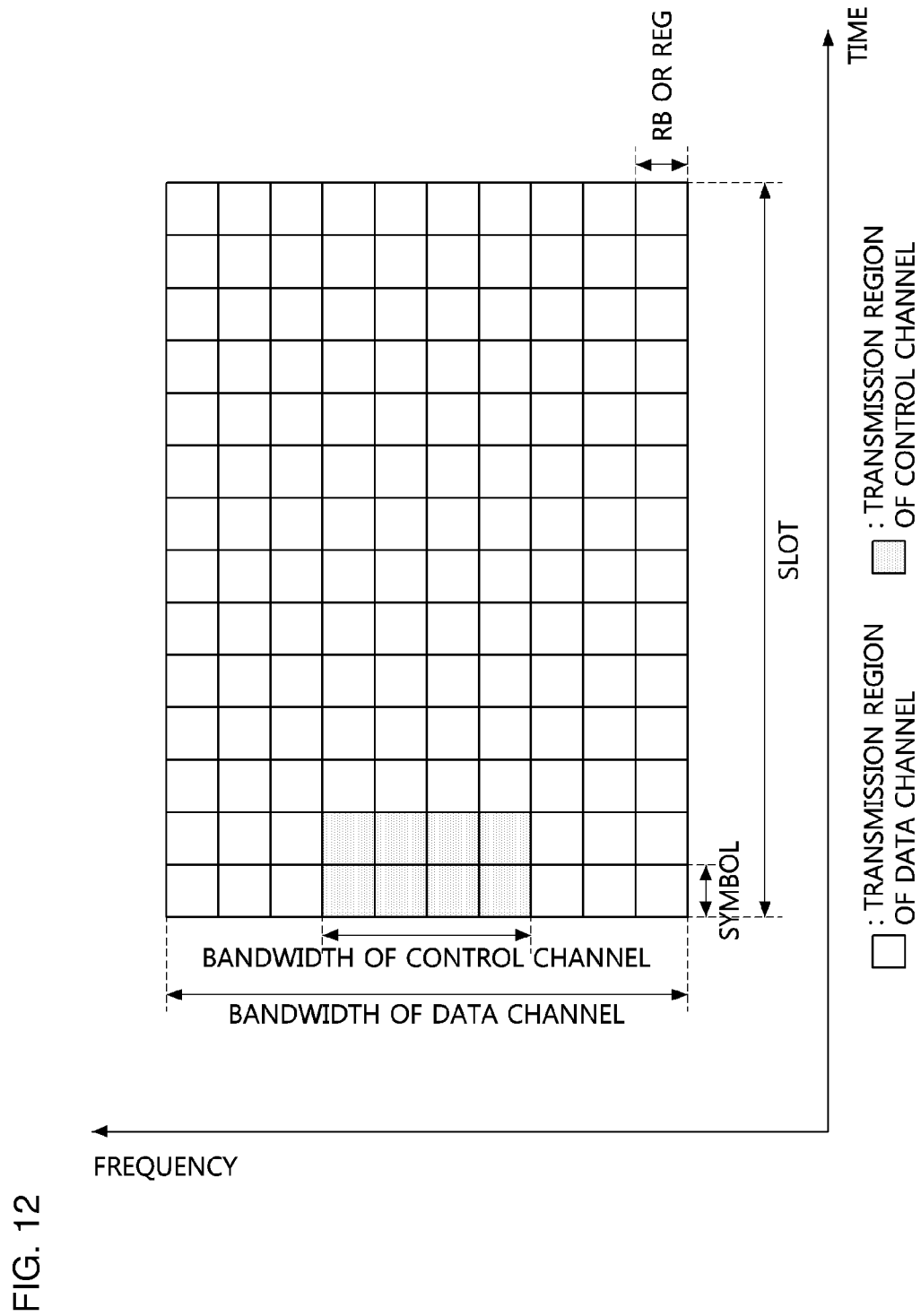
FIG. 12 is a conceptual diagram illustrating a first embodiment of a data/control channel in a wireless communication network.

FIG. 12 is a conceptual diagram illustrating a first embodiment of a data/control channel in a wireless communication network.

Referring to FIG. 12, a bandwidth of a data channel in the frequency axis may be equal to a system bandwidth or one bandwidth part, and a bandwidth of a control channel in the frequency axis may be equal to or less than the bandwidth of the data channel. For example, in the frequency axis, a data channel may occupy 10 resource element groups (REGs) (or 10 resource blocks (RBs)), and in the frequency axis, a control channel may occupy 4 REGs (or 4 RBs). The bandwidth of the data channel may be variably configured for each UE. One slot in the time axis may comprise 14 symbols. For example, the data channel in the time axis may occupy 14 symbols, and in the time axis, the control channel may occupy 2 symbols.

The UE may perform reception/demodulation/decoding operations on the data channel in a transmission region of the data channel, and may perform detection/demodulation/decoding operations on the control channel in a transmission region of the control channel (e.g., a transmission region of the control channel composed of 4 REGs). The transmission region of the control channel may be referred to as a 'control resource set (CORESET)'. In the time axis, the CORESET may be configured in units of symbol, and in the frequency axis, the CORESET may be configured in units of REG or RB.

Configuration information of the CORESET may be transmitted through a synchronization signal/physical broadcast channel (SS/PBCH) block (e.g., a PBCH included in the SS/PBCH block). Alternatively, the configuration of the CORESET may be transmitted through an upper layer message (e.g., radio resource control (RRC) message). The configuration information of the CORESET may indicate a time-frequency resource in which the CORESET is configured. For example, the configuration information of the CORESET may include an index of a starting symbol of the CORESET in the time axis. The starting symbol of the CORESET may be a symbol #0, #1, or #2 within a slot.

Also, the configuration information of the CORESET may include information indicating the length of the CORESET in the time axis. The length of the CORESET may be configured in units of symbol. For example, the length of the CORESET may be set to 1 symbol, 2 symbols, or 3 symbols.

Also, the configuration information of the CORESET may include information indicating an offset between a reference position and the CORESET (e.g., a lowest frequency region (e.g., RB, REG, or subcarrier) of a frequency band in which the CORESET is configured) in the frequency axis, and information indicating the size of the CORESET in the frequency axis. Here, the offset and the size of the CORESET may be configured in units of RB (or, REG).

Meanwhile, the CORESET may be configured in units of control channel element (CCE). The CCE may be a minimum unit of resources used for transmission of control information. The CCE may be a set of REGs.

Figure 13A:
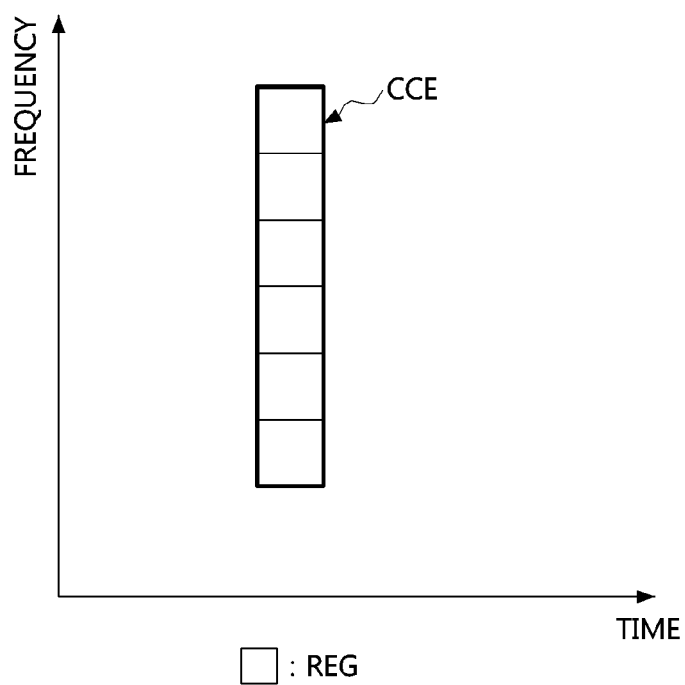
FIG. 13A is a conceptual diagram illustrating a first embodiment of CCE in a wireless communication network.

FIG. 13A is a conceptual diagram illustrating a first embodiment of CCE in a wireless communication network.

Referring to FIG. 13A, one CCE may include 6 REGs. For example, a CCE may be composed of one symbol in the time axis, and may be composed of 6 REGs in the frequency axis.

Figure 13B:
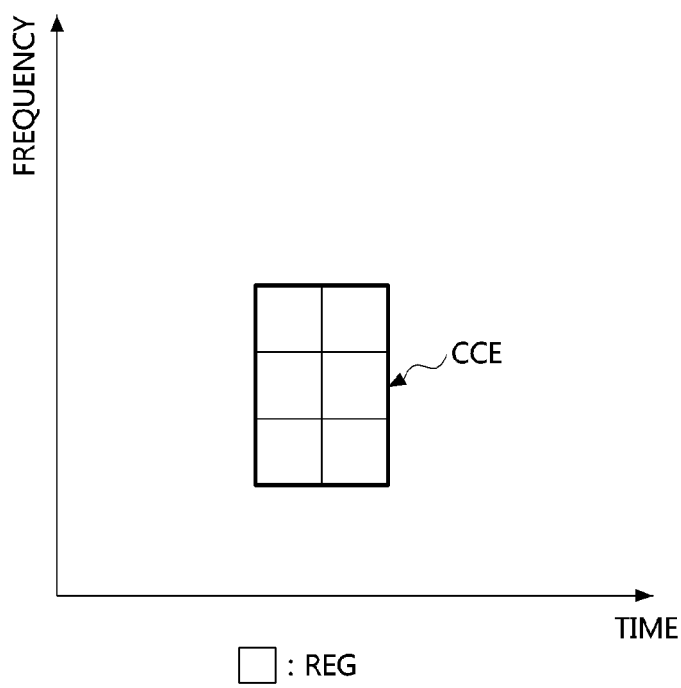
FIG. 13B is a conceptual diagram illustrating a second embodiment of CCE in a wireless communication network.

FIG. 13B is a conceptual diagram illustrating a second embodiment of CCE in a wireless communication network.

Referring to FIG. 13B, one CCE may include 6 REGs. For example, a CCE may be composed of 2 symbols in the time axis, and may be composed of 3 REGs in the frequency axis.

Figure 13C:
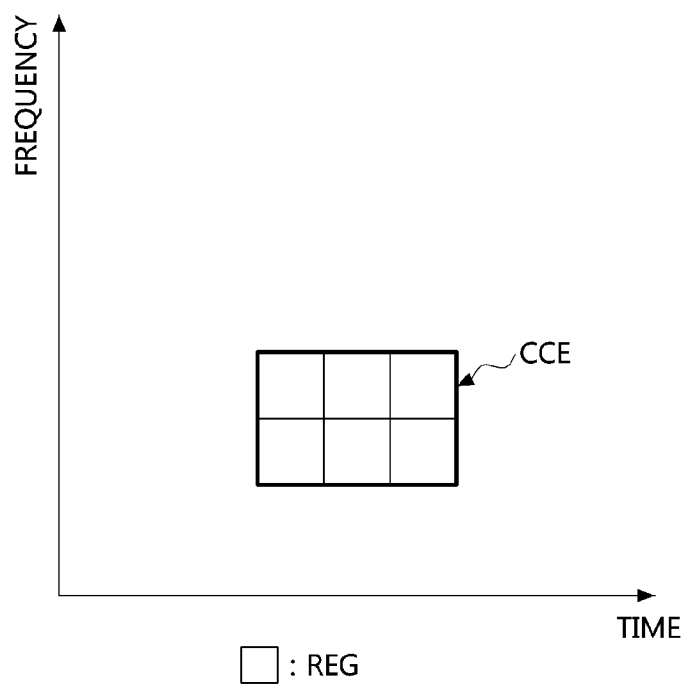
FIG. 13C is a conceptual diagram illustrating a third embodiment of CCE in a wireless communication network.

FIG. 13C is a conceptual diagram illustrating a third embodiment of CCE in a wireless communication network.

Referring to FIG. 13C, one CCE may include 6 REGs. For example, a CCE may be composed of 3 symbols in the time axis, and may be composed of 2 REGs in the frequency axis.

On the other hand, a CCE may be configured according to the length of the CORESET in the time axis. For example, a CCE for the CORESET composed of one symbol in the time axis may be configured the same as the CCE shown in FIG. 13A. A CCE for the CORESET composed of 2 symbols in the time axis may be configured the same as the CCE shown in FIG. 13B. Alternatively, a CCE for the CORESET composed of 2 symbols in the time axis may have a configuration in which 2 CCEs having the same structure as the embodiment shown in FIG. 13A are consecutively configured in the time axis.

A CCE for the CORESET composed of 3 symbols in the time axis may be configured the same as the CCE shown in FIG. 13C. Alternatively, a CCE for the CORESET composed of 3 symbols in the time axis may have a configuration in which one CCE having the same structure as the embodiment shown in FIG. 13A and one CCE having the same structure as the embodiment shown in FIG. 13B are consecutively configured in the time axis. Alternatively, a CCE for the CORESET composed of 3 symbols in the time axis may have a configuration in which 3 CCEs having the same structure as the embodiment shown in FIG. 13A are consecutively configured in the time axis.

Next, a control channel allocation procedure and a control channel detection procedure will be described.

Figure 14:
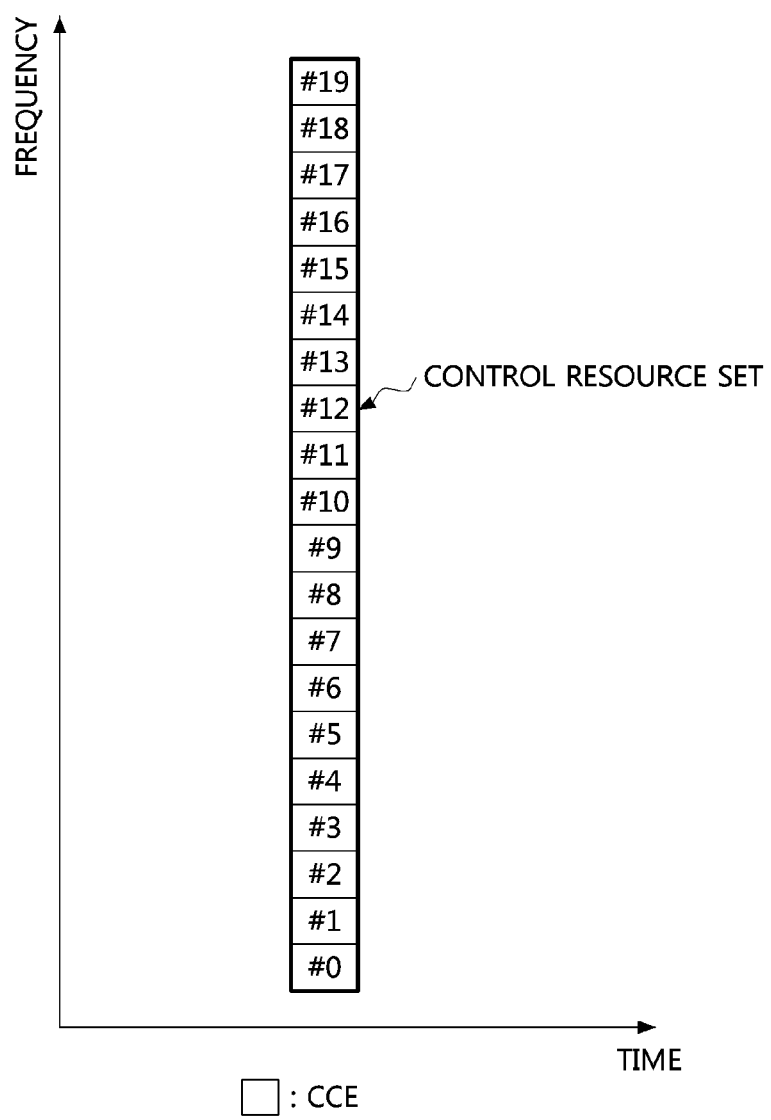
FIG. 14 is a conceptual diagram illustrating a first embodiment of CORESET in a wireless communication network.

FIG. 14 is a conceptual diagram illustrating a first embodiment of CORESET in a wireless communication network.

Referring to FIG. 14, a CORESET may include a plurality of CCEs. For example, the CORESET may include CCEs #0 to #19. The CCEs #0 to #19 may be the CCEs shown in FIGS. 13A to 13C. The base station may configure a control channel in units of CCE. Also, the base station may configure a control channel by aggregating CCEs, and may transmit control information through the aggregated CCEs constituting the control channel.

For example, an aggregation level of CCEs may be 1, 2, 4, or 8. When the aggregation level 1 is used, the base station may configure a control channel including one CCE (e.g., CCE #0) and transmit control information through the configured control channel. When the aggregation level 2 is used, the base station may configure a control channel including 2 CCEs (e.g., CCEs #0 and #1) and transmit control information through the configured control channel. When the aggregation level 4 is used, the base station may configure a control channel including 4 CCEs (e.g., CCEs #0 to #3) and transmit control information through the configured control channel. When the aggregation level 8 is used, the base station may configure a control channel including 8 CCEs (e.g., CCEs #0 to #7) and transmit control information through the configured control channel.

On the other hand, among the CCEs constituting the CORESET, a starting CCE may be different for each UE. For example, when a starting CCE for a UE #0 is the CCE #0 and the aggregation level 4 is used, the base station may transmit control information to the UE #0 through a control channel including the CCEs #0 to #3. When a starting CCE for a UE #1 is the CCE #10 and the aggregation level 4 is used, the base station may transmit control information to the UE #1 through a control channel including the CCEs #10 to #13. The starting CCE in the CORESET may be determined based on one or more of the following information elements.

Unique identification number of UE
Transmission position of the CORESET
The number of CCEs included in the CORESET
Aggregation level of the CCEs
The number of control channels which the UE should monitors according to the aggregation level
Carrier offset The starting CCE among the CCEs constituting the COREST may be defined based on Equation 1 below. That is, a result of Equation 1 may indicate an index of the starting CCE.

$$L\{(Y_k+m') \bmod \lfloor N_{CCE}/L \rfloor\} \quad \text{[Equation 1]}$$

In Equation 1, 'mod' denotes a modular operation, and $\lfloor X \rfloor$ may denote the greatest integer less than X. L may denote an aggregation level, and $N_{CCE}$ may denote the number of CCEs included in the CORESET. $Y_k$ may be determined based on the unique identification number of the UE and the transmission position of the CORESET. $Y_k$ may be defined based on Equation 2 below.

$$Y_k = (A \cdot Y_{k-1}) \bmod D \quad \text{[Equation 2]}$$

Each of A and B may be a predefined constant. k of $Y_k$ may denote an index of a slot in which the CORESET is transmitted. An initial value of $Y_k$ may be defined as '$Y_{-1}$=Terminal_ID', and the Terminal_ID may be the unique identification number of the UE. Alternatively, $Y_k$ may be defined based on Equation 3 or 4 below.

$$Y_k = (A \cdot s \cdot Y_{k-1}) \bmod D \quad \text{[Equation 3]}$$

$$Y_k = (A \cdot (Y_{k-1}+s)) \bmod D \quad \text{[Equation 4]}$$

In Equations 3 and 4, s may be an index of the starting symbol of the CORESET in the time axis. In Equation 1, m' may be defined based on Equation 5 below.

$$m' = m + \text{offset} \quad \text{[Equation 5]}$$

In Equation 5, m' may be defined as 'm=0, 1, . . . , $R_i$'. $R_i$ may indicate the number of candidate control channels (e.g., candidate physical downlink control channels (PDCCHs)) when an aggregation level 1 is used. When m is $R_i$, m' may be the maximum number of attempts in the control channel detection procedure performed by the UE. In Equation 5, the offset may be determined according to a carrier offset.

When a carrier through which a control channel is transmitted is different from a carrier through which a data channel scheduled by the control channel is transmitted, the carrier offset may be an offset between an index of the carrier through which the control channel is transmitted and an index of the carrier through which the data channel is transmitted. Alternatively, when a bandwidth part in which a control channel is transmitted is different from a bandwidth part in which a data channel scheduled by the corresponding control channel is transmitted, the carrier offset may be an offset between an index of the bandwidth part in which the control channel is transmitted and an index of the bandwidth part in which the data channel is transmitted.

Meanwhile, the variables used in Equations 1 to 5 may vary according to the CORESET. For example, $N_{CCE}$ may vary depending on the CORESET. Alternatively, each of A and D used for calculating $Y_k$ may vary depending on the CORESET.

The control channel may include L consecutive CCEs starting from the starting CCE defined based on Equation 1. Therefore, the UE may perform the detection operation on control channels in the L consecutive CCEs starting from the starting CCE defined based on Equation 1.

A monitoring periodicity of the CORESET (e.g., an occasion of the CORESET) may be configured, and the base station may transmit to the UE an upper layer message indicating the monitoring periodicity of the CORESET. The UE may receive the upper layer message from the base station, and may identify the monitoring periodicity of the CORESET based on the upper layer message. Accordingly, the UE may perform the detection operation on the CORESET according to the monitoring periodicity indicated by the upper layer message. Here, the monitoring periodicity of the CORESET may be configured in units of slot. For example, the monitoring periodicity of the CORESET may be 1 or 2 slots.

The base station may also inform the UE of an offset for the monitoring periodicity of the CORESET. The offset for the monitoring periodicity of the CORESET may be transmitted through an upper layer message or a control channel. The offset for the monitoring periodicity of the CORESET may be configured in units of slot. The offset for the monitoring periodicity of the CORESET may be equal to or less than the monitoring periodicity of the CORESET.

For example, when the monitoring periodicity of the CORESET is 2 slots, the offset for the monitoring periodicity of the CORESET may be set to 0 or 1 slot. When the monitoring periodicity of the CORESET is 2 slots and the offset for the monitoring periodicity of the CORESET is 0, the UE may perform the monitoring operation on the CORESET in the slots #0, #2, #4, and the like. Alternatively, when the monitoring periodicity of the CORESET is 2 slots and the offset for the monitoring periodicity of the CORESET is 1 slot, the UE may perform the monitoring operation on the CORESET in the slots #1, #3, #5, and the like.

Also, the base station may inform the UE of the symbols in which the monitoring operation on the CORESET is to be performed. Information (hereinafter referred to as a 'symbol indicator') indicating the symbols in which the monitoring operation on the CORESET is to be performed may be transmitted through an upper layer message or a control channel. The symbol indicator may be represented as a bitmap. When one slot includes 14 symbols, the size of the symbol indicator may be 14 bits. A specific bit among the bits constituting the symbol indicator may indicate whether to perform the monitoring operation on the CORESET in the symbol corresponding to the specific bit.

For example, a specific bit set to '0' may indicate that it is unnecessary to perform the monitoring operation on the CORESET in the symbol corresponding to the specific bit. A specific bit set to '1' may indicate that it is necessary to perform the monitoring operation on the CORESET in the symbol corresponding to the specific bit. The symbol indicator set to '11100000000000' may indicate that the monitoring operation on the CORESET is required to be performed in the symbols #0 to #1 in the slot.

Also, the base station may transmit to the UE information indicating the number of monitoring on the CORESET for each aggregation level. The information indicating the number of monitoring on the CORESET for each aggregation level may be transmitted through an upper layer message or a control channel. For example, when the aggregation level is 1, the number of monitoring on the CORESET may be set to Y. When Y is 0, the UE may not perform the monitoring operation on the CORESET in a wireless communication network in which the aggregation level 1 is used. Here, 1 may be 1, 2, 4 or 8, and Y may be one of 0 to 7.

Next, methods of transmitting and receiving system information in a wireless communication network will be described. The base station may transmit common information for a cell (e.g., a cell formed by the base stations) to the UEs within the cell. The common information may be common system information, common control information, and the like. The common information may be transmitted in a broadcasting manner to the UEs within the cell, and a channel used for transmission and reception of the common information may be a PBCH. The PBCH may be transmitted without scheduling information.

The base station may transmit a synchronization signal so that the UEs in the cell can acquire time-frequency synchronization. The synchronization signal may be transmitted in a broadcasting manner to the UEs within the cell. The synchronization signal may be transmitted together with the PBCH, and a set of synchronization signal and the PBCH may be referred to as an SS/PBCH block. In addition, an SS/PBCH block may further include a PBCH demodulation reference signal (PBCH-DMRS) used for demodulating the PBCH.

Figure 15A:
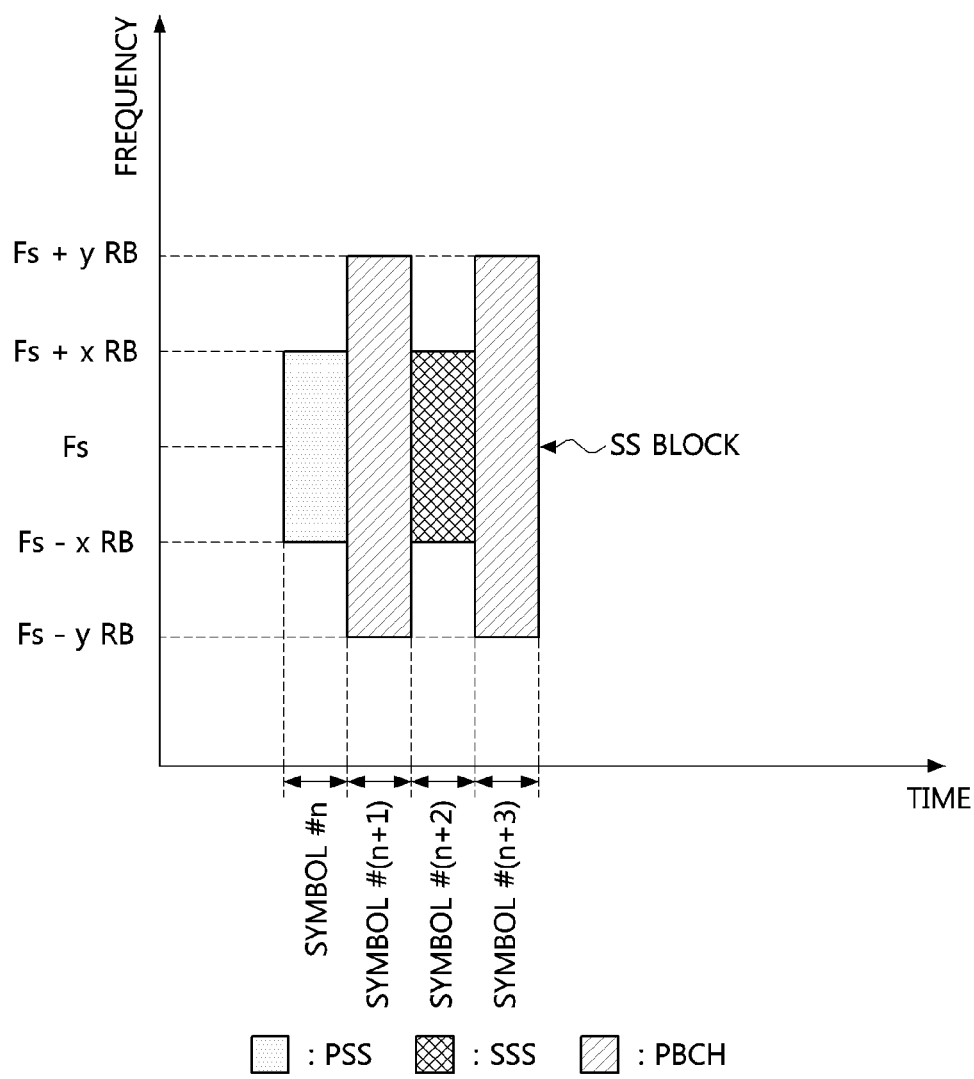
FIG. 15A is a conceptual diagram illustrating a first embodiment of SS/PBCH block in a wireless communication network.

FIG. 15A is a conceptual diagram illustrating a first embodiment of SS/PBCH block in a wireless communication network.

Referring to FIG. 15A, an SS/PBCH block may be composed of 4 OFDM symbols in the time axis. The first symbol (i.e., symbol #n) of the 4 OFDM symbols may be composed of PSS, the second symbol (i.e., symbol #n+1) of the 4 OFDM symbols may be composed of PBCH, the third symbol (i.e., symbol #n+2) of the 4 OFDM symbols may be composed of SSS, and the fourth symbol (i.e., symbol #n+3) of the 4 OFDM symbols may be composed of PBCH. Each of the PSS and SSS may be a specific sequence and may be used for acquisition of synchronization and cell information at the UE. The PBCH may be used to convey cell related information.

Figure 15B:
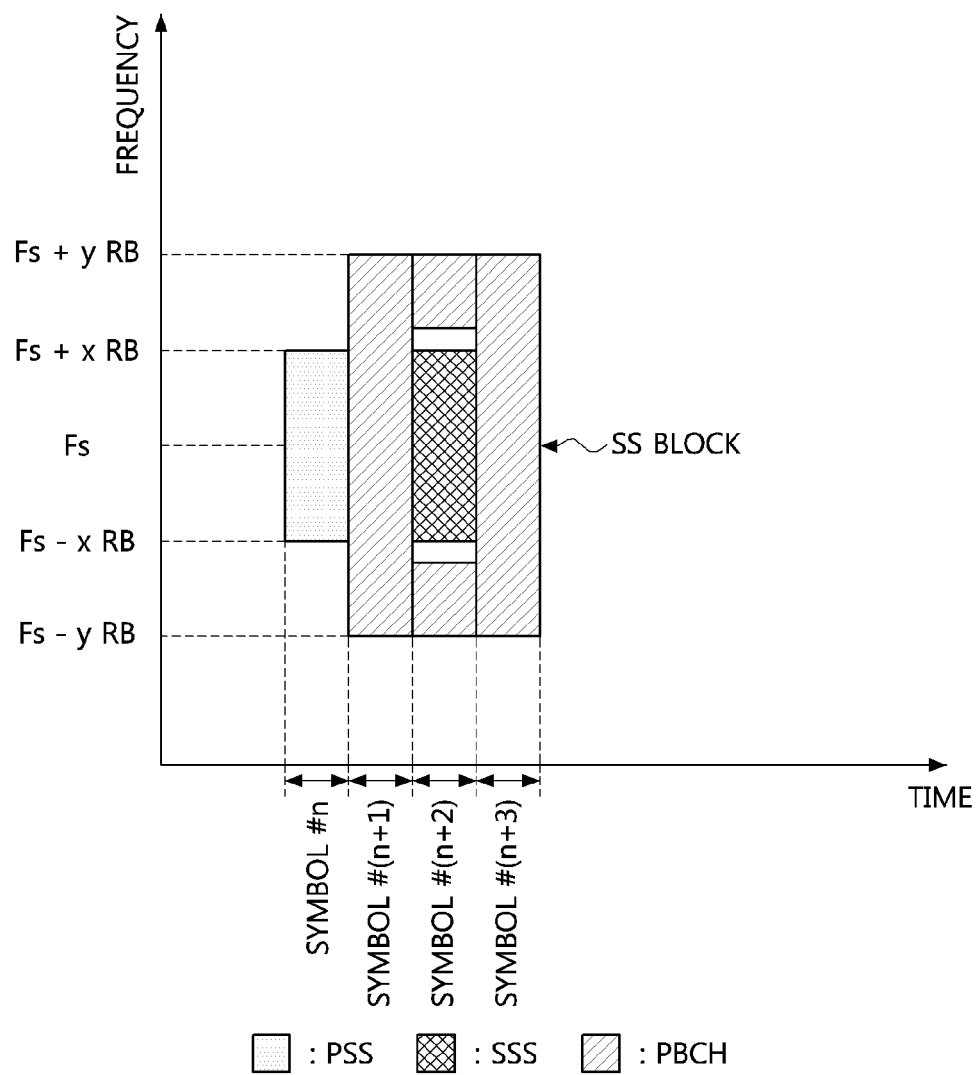
FIG. 15B is a conceptual diagram illustrating a second embodiment of SS/PBCH block in a wireless communication network.

FIG. 15B is a conceptual diagram illustrating a second embodiment of SS/PBCH block in a wireless communication network.

Referring to FIG. 15B, an SS/PBCH block may be composed of 4 OFDM symbols in the time axis. The first symbol (i.e., symbol #n) of the 4 OFDM symbols may be composed of PSS, the second symbol (i.e., symbol #n+1) of the 4 OFDM symbols may be composed of PBCH, the third symbol (i.e., symbol #n+2) of the 4 OFDM symbols may be composed of SSS and PBCH, and the fourth symbol (i.e., symbol #n+3) of the 4 OFDM symbols may be composed of PBCH.

The size of each of the PSS and SSS in the frequency axis may be 2x RBs centered on a center frequency Fs of the SS/PBCH block. Here, x may be 6. The size of the PBCH in the frequency axis may be 2y RBs centered on the center frequency Fs of the SS/PBCH block. Here, y may be 12. When one RB is composed of 12 subcarriers, each of the PSS and SSS may be transmitted in 144 subcarriers. When indexes of 144 subcarriers are set to #0 to #143, each of the PSS and the SSS may be actually transmitted in the subcarriers #8 to #134 (i.e., 127 subcarriers). In this case, signals (e.g., PSS or SSS) may not be transmitted in the remaining 17 subcarriers (i.e., subcarriers #0 to #7 and subcarriers #135 to #143).

In the wireless communication network, some system information (e.g., minimum system information) may be transmitted through the SS/PBCH block (e.g., the PBCH included in the SS/PBCH block). The system information transmitted through the SS/PBCH block may include SFN, timing information of the SS/PBCH block (e.g., index of the SS/PBCH block), configuration information of the CORE-SET (e.g., information indicating the time-frequency resource of the CORESET), and the like. The minimum system information may be transmitted through the SS/PBCH block because there is a limitation in a time-frequency resource used for transmission and reception of the PBCH included in the SS/PBCH block.

The system information (e.g., remaining minimum system information (RMSI)) not transmitted through the SS/PBCH block may be transmitted through a control channel or a data channel. In addition, other system information (OSI) may be transmitted through a control channel or a data channel at the request of the UE. The OSI may be system information other than the minimum system information and the RMSI. The RMSI may include information on a CORESET for a cell common search space used for transmission of cell common information. Also, the RMSI may include information on a CORESET for each UE.

When the RMSI is transmitted through a data channel, information on a CORESET including a control channel for scheduling the data channel through which the RMSI is transmitted may be included in the minimum system information (e.g., the minimum system information transmitted through the SS/PBCH block). The RMSI related information transmitted through the SS/PBCH block may include one or more of the following information elements.

Configuration information of the data through which the RMSI is transmitted (e.g., information on OFDM environment parameters)

Configuration information of the control channel scheduling the data channel through which the RMSI is transmitted (e.g., information on OFDM environment parameters)

Information on a modulation order of the control channel scheduling the data channel through which the RMSI is transmitted Information indicating the time-frequency resource of the control channel scheduling the data channel through which the RMSI is transmitted Information indicating the time-frequency resource of the CORESET through which the control channel scheduling the data channel through which the RMSI is transmitted can be transmitted Here, the OFDM environment parameters may include a subcarrier spacing, a cyclic prefix (CP), and the like. For example, the OFDM environment parameters of the data channel through which the RMSI is transmitted and the OFDM environment parameters of the control channel scheduling the data channel through which the RMSI is transmitted may be the same as the OFDM environment parameters of the SS/PBCH block.

When an SS/PBCH block is transmitted according to a 15 kHz subcarrier spacing, RMSI associated with the SS/PBCH block may be scheduled by a control channel having a 15 kHz subcarrier spacing. Also, OFDM environment parameters of a data channel including the RMSI may be the same as the OFDM environment parameters of the control channel scheduling the data channel including the RMSI. In this case, a DCI scheduling the RMSI may not include the OFDM environment parameters of the data channel including the RMSI.

Meanwhile, the control channel including the scheduling information for the data channel may be scrambled based on the unique ID of each UE. On the other hand, when the RMSI is transmitted in common to the UEs within the cell, the control channel including the scheduling information for the data channel including the RMSI may be scrambled based on a cell common ID. Also, the control channel including the scheduling information for the data channel including the RMSI may be transmitted in a cell common search space. The UE may detect the control channel including the scheduling information for the data channel including the RMSI by using the cell common ID. The detection operation on the control channel may be performed in the cell common search space.

Since the minimum system information is transmitted through the SS/PBCH block and the RMSI is transmitted through the data channel, the SS/PBCH block and the data channel may be transmitted in association with each other. For example, the SS/PBCH block and the data channel may be multiplexed (e.g., frequency division multiplexing) in the frequency axis.

Figure 16:
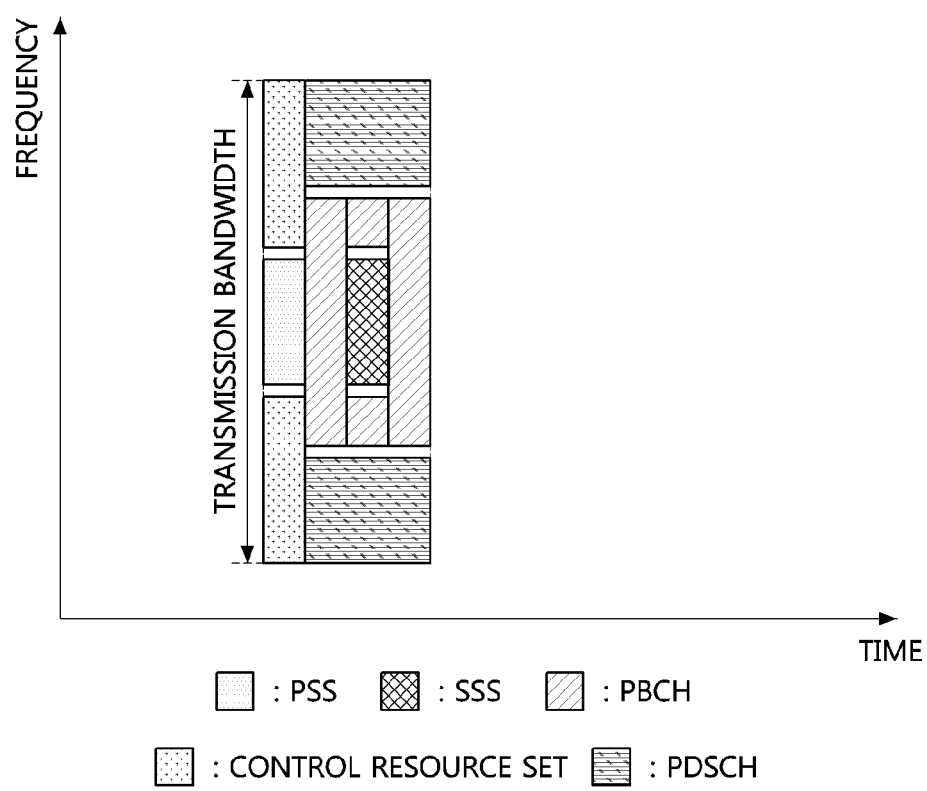
FIG. 16 is a conceptual diagram illustrating a first embodiment of a method for transmitting an SS/PBCH block, a PDCCH and a PDSCH in a wireless communication network.

FIG. 16 is a conceptual diagram illustrating a first embodiment of a method for transmitting an SS/PBCH block, a PDCCH and a PDSCH in a wireless communication network.

Referring to FIG. 16, RMSI may be transmitted through a PDSCH, a PDCCH including scheduling information for the PDSCH through which the RMSI is transmitted may be transmitted within a CORESET, and configuration information of the CORESET may be transmitted through an SS/PBCH block. The CORESET may be multiplexed with the SS/PBCH block in the frequency axis. For example, the CORESET may be configured in one or more frequency resources among lower frequency resources and higher frequency resources than the frequency band in which the SS/PBCH block is located. Also, the PDSCH through which the RMSI is transmitted may be multiplexed with the SS/PBCH block in the frequency axis. For example, the PDSCH may be configured in one or more frequency resources among lower frequency resources and higher frequency resources than the frequency band in which the SS/PBCH block is located.

The sum of the length of the CORESET and the length of the PDSCH in the time axis may be equal to the length of the SS/PBCH block. For example, the length of the CORESET in the time axis may be the length of one symbol, and the length of the PDSCH in the time axis may be the length of 3 symbols. The starting position of the CORESET may be the same as the starting position of the SS/PBCH block in the time axis, and the ending position of the PDSCH may be the same as the ending position of the SS/PBCH block in the time axis.

The configuration information of the CORESET, which is transmitted through the SS/PBCH block, may indicate one of information (e.g., index of RB, REG, or subcarrier) on the lowest frequency within a frequency band occupied by the CORESET and information (e.g., index of RB, REG, or subcarrier) on the highest frequency within the frequency bad occupied by the CORESET. Accordingly, the UE receiving the SS/PBCH block may identify the position of the CORESET based on the configuration information of the CORESET, which is included in the SS/PBCH block.

Meanwhile, the PDCCH transmitted in the CORESET may include information indicating the size of the PDSCH in the frequency axis. When the size of the PDSCH in the frequency axis indicated by the PDCCH is equal to the size of the CORESET in the frequency axis, the UE may obtain the PDSCH by performing rate matching in the resource region indicated by the PDCCH.

When the SS/PBCH block and the PDSCH (or, the SS/PBCH block and the CORESET) are multiplexed in the frequency axis, the size of the multiplexed signal in the frequency axis may be referred to as a transmission bandwidth. The transmission bandwidth may be less than or equal to a minimum operation bandwidth required for the UE. When the SS/PBCH block and the CORESET are multiplexed in the frequency axis and the SS/PBCH block and the PDSCH are multiplexed in the frequency axis, the multiplexed signal may be transmitted using the same beam.

Figure 17:
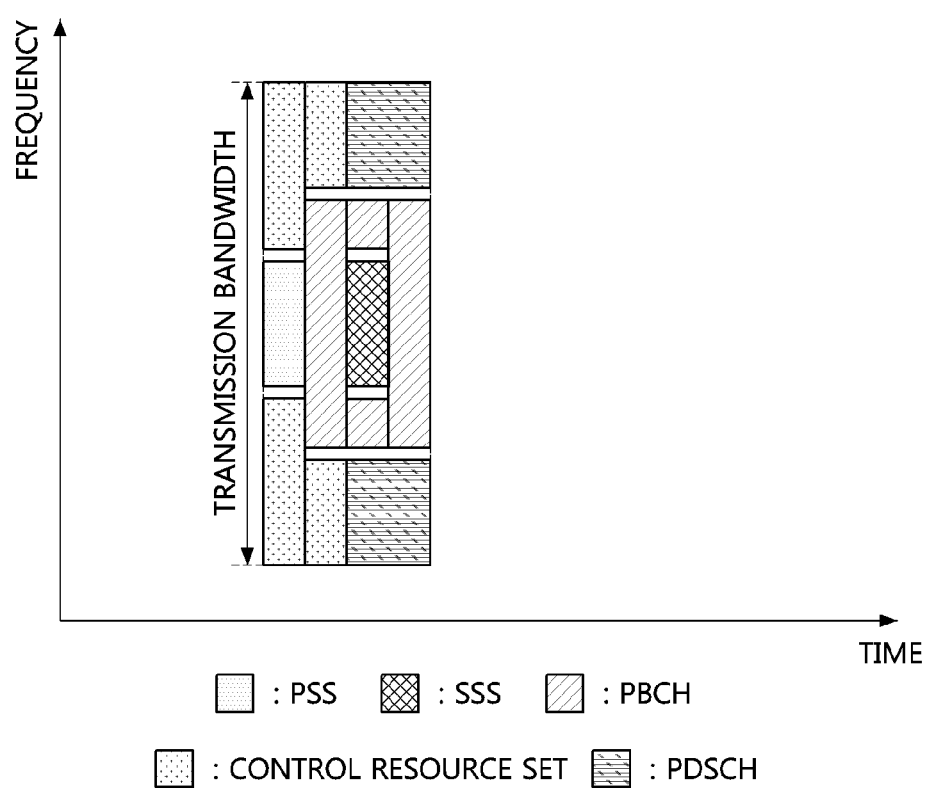
FIG. 17 is a conceptual diagram illustrating a second embodiment of a method for transmitting an SS/PBCH block, a PDCCH and a PDSCH in a wireless communication network.

FIG. 17 is a conceptual diagram illustrating a second embodiment of a method for transmitting an SS/PBCH block, a PDCCH and a PDSCH in a wireless communication network.

Referring to FIG. 17, RMSI may be transmitted through a PDSCH, a PDCCH including scheduling information for the PDSCH through which the RMSI is transmitted may be transmitted within a CORESET, and configuration information of the CORESET may be transmitted through an SS/PBCH block. The CORESET may be multiplexed with the SS/PBCH block in the frequency axis. For example, the CORESET may be configured in one or more frequency resources among lower frequency resources and higher frequency resources than the frequency band in which the SS/PBCH block is located. Also, the PDSCH through which the RMSI is transmitted may be multiplexed with the SS/PBCH block in the frequency axis. For example, the PDSCH may be configured in one or more frequency resources among lower frequency resources and higher frequency resources than the frequency band in which the SS/PBCH block is located.

The sum of the length of the CORESET and the length of the PDSCH in the time axis may be equal to the length of the SS/PBCH block. For example, the length of the CORESET in the time axis may be the length of 2 symbols, and the length of the PDSCH in the time axis may be the length of 2 symbols. The starting position of the CORESET may be the same as the starting position of the SS/PBCH block in the time axis, and the ending position of the PDSCH may be the same as the ending position of the SS/PBCH block in the time axis.

The configuration information of the CORESET, which is transmitted through the SS/PBCH block, may indicate one of information (e.g., index of RB, REG, or subcarrier) on the lowest frequency within a frequency band occupied by the CORESET and information (e.g., index of RB, REG, or subcarrier) on the highest frequency within the frequency bad occupied by the CORESET. Accordingly, the UE receiving the SS/PBCH block may identify the position of the CORESET based on the configuration information of the CORESET, which is included in the SS/PBCH block.

Meanwhile, the SS/PBCH block may include information indicating time-frequency resources of the CORESET, and the time-frequency resources of the CORESET indicated by the SS/PBCH block may include time-frequency resources in which the SS/PBCH block is located. The UE receiving the SS/PBCH block may determine that the CORESET is configured in the remaining time-frequency resources excluding the time-frequency resource in which the SS/PBCH block is located among the time-frequency resources indicated by the SS/PBCH block.

Also, the PDCCH transmitted in the CORESET may include information indicating the size of the PDSCH in the frequency axis. When the size of the PDSCH in the frequency axis indicated by the PDCCH is equal to the size of the CORESET in the frequency axis, the UE may obtain the PDSCH by performing rate matching in the resource region indicated by the PDCCH.

Figure 18:
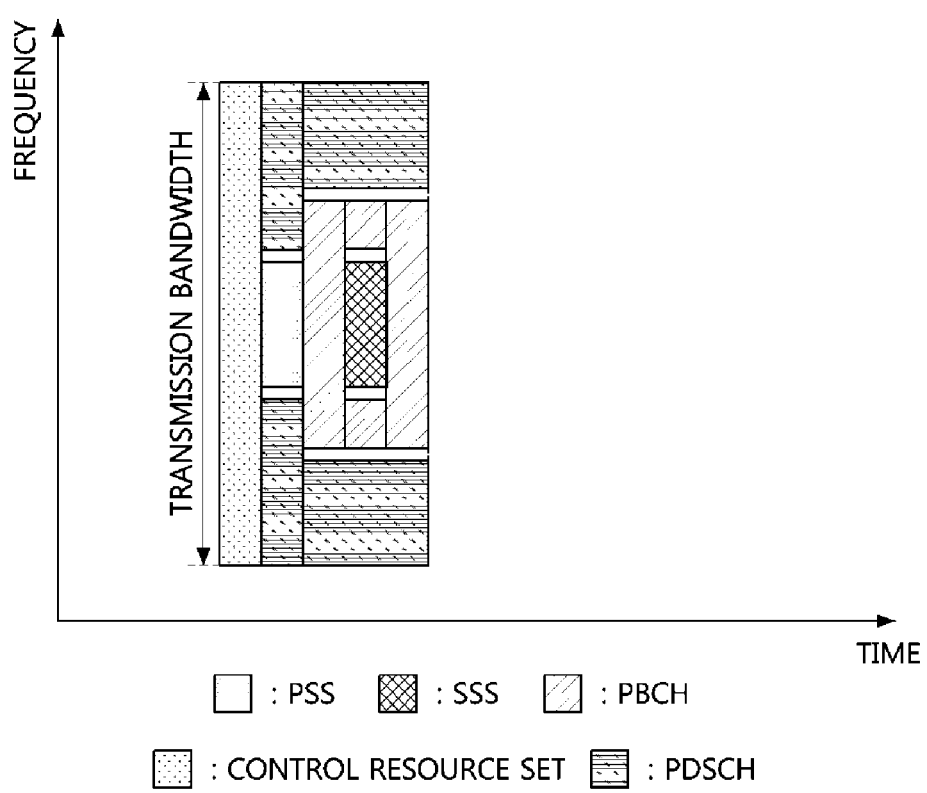
FIG. 18 is a conceptual diagram illustrating a third embodiment of a method for transmitting an SS/PBCH block, a PDCCH and a PDSCH in a wireless communication network.

FIG. 18 is a conceptual diagram illustrating a third embodiment of a method for transmitting an SS/PBCH block, a PDCCH and a PDSCH in a wireless communication network.

Referring to FIG. 18, RMSI may be transmitted through a PDSCH, a PDCCH including scheduling information for the PDSCH through which the RMSI is transmitted may be transmitted within a CORESET, and configuration information of the CORESET may be transmitted through an SS/PBCH block. The CORESET may be multiplexed with the SS/PBCH block in the time axis (e.g., time division multiplexing (TDM)). The PDSCH through which the RMSI is transmitted may be multiplexed with the SS/PBCH block in the frequency axis. For example, the PDSCH may be configured in one or more frequency resources among lower frequency resources and higher frequency resources than the frequency band in which the SS/PBCH block is located.

The length of the PDSCH including the RMSI may be equal to the length of the SS/PBCH block in the time axis. The starting position of the PDSCH including the RMSI may be the same as the starting position of the SS/PBCH block in the time axis, and the ending position of the PDSCH including the RMSI may be the same as the ending position of the SS/PBCH block in the time axis.

The size of the CORESET in the frequency axis may be equal to the sum of the size of the SS/PBCH block and the size of the PDSCH in the frequency axis. The size of the CORESET in the frequency axis may be referred to as a transmission bandwidth. The transmission bandwidth may be less than or equal to a minimum operation bandwidth required for the UE. When the SS/PBCH block and the CORESET are multiplexed in the time axis and the SS/PBCH block and the PDSCH are multiplexed in the frequency axis, the multiplexed signal may be transmitted using the same beam.

The configuration information of the CORESET, which is transmitted through the SS/PBCH block, may indicate one of information (e.g., index of RB, REG, or subcarrier) on the lowest frequency within a frequency band occupied by the CORESET and information (e.g., index of RB, REG, or subcarrier) on the highest frequency within the frequency bad occupied by the CORESET. Also, the configuration information of the CORESET, which is transmitted through the SS/PBCH block, may indicate the length of the time resources occupied by the CORESET. Accordingly, the UE receiving the SS/PBCH block may identify the position of the CORESET based on the configuration information of the CORESET, which is included in the SS/PBCH block.

The PDCCH transmitted in the CORESET may include information indicating the size of the PDSCH in the frequency axis. When the size of the PDSCH in the frequency axis indicated by the PDCCH is equal to the size of the CORESET in the frequency axis, the UE may obtain the PDSCH by performing rate matching in the resource region indicated by the PDCCH.

Figure 19:
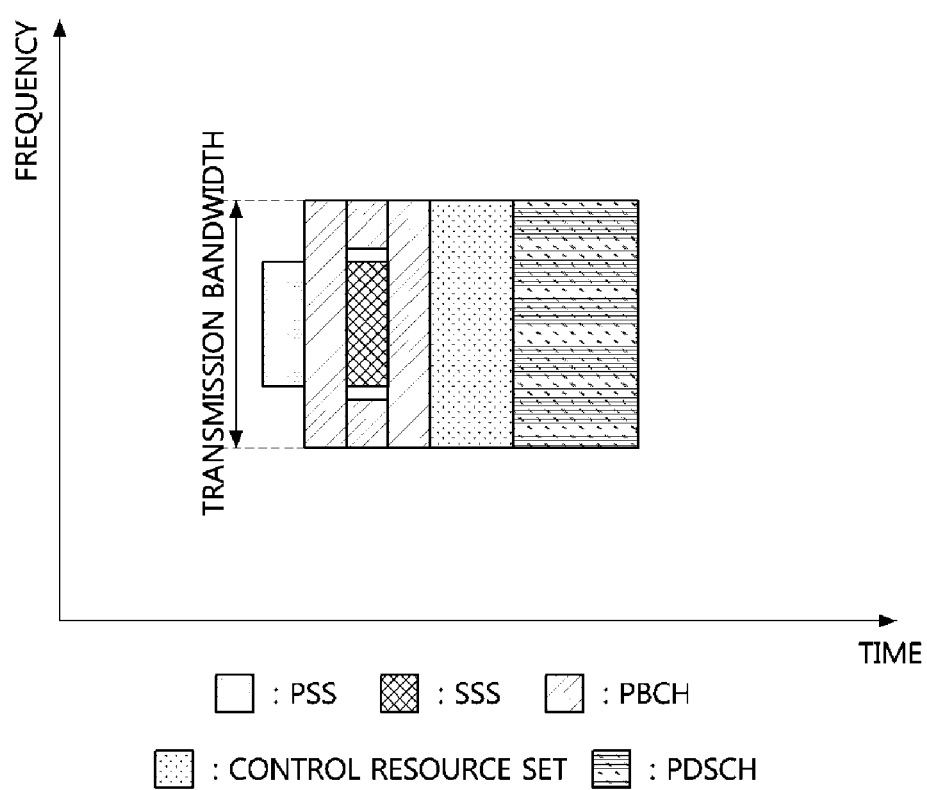
FIG. 19 is a conceptual diagram illustrating a fourth embodiment of a method for transmitting an SS/PBCH block, a PDCCH and a PDSCH in a wireless communication network.

FIG. 19 is a conceptual diagram illustrating a fourth embodiment of a method for transmitting an SS/PBCH block, a PDCCH and a PDSCH in a wireless communication network.

Referring to FIG. 19, RMSI may be transmitted through a PDSCH, a PDCCH including scheduling information for the PDSCH through which the RMSI is transmitted may be transmitted within a CORESET, and configuration information of the CORESET may be transmitted through an SS/PBCH block. The CORESET may be multiplexed with the SS/PBCH block in the time axis. The PDSCH including the RMSI may be multiplexed with the SS/PBCH block in the time axis. The CORESET and the PDSCH may be adjacently multiplexed with the SS/PBCH block in the time axis.

Each of the length of the CORESET and the length of the PDSCH in the time axis may be determined independently of the length of the SS/PBCH block in the time axis. Each of the size of the CORESET and the size of the PDSCH in the frequency axis may be the same as the size of the SS/PBCH block in the frequency axis. The size of the SS/PBCH block in the frequency axis may be referred to as a transmission bandwidth. The transmission bandwidth may be less than or equal to a minimum operation bandwidth required for the UE. Alternatively, each of the size of the CORESET and the size of the PDSCH in the frequency axis may be greater than the size of the SS/PBCH block in the frequency axis. When the SS/PBCH block, the CORESET, and the PDSCH are multiplexed, the multiplexed signal may be transmitted using the same beam.

The SS/PBCH block may include configuration information of the CORESET. For example, the configuration information of the CORESET may indicate the starting position and the length of the CORESET in the time axis. The UE receiving the SS/PBCH block may identify the position of the CORESET based on the configuration information of the CORESET, which is included in the SS/PBCH block. Here, the size of the CORESET in the frequency axis may be configured to be equal to the size of the SS/PBCH block in the frequency axis.

The PDCCH transmitted in the CORESET may include information indicating a time-frequency resource of the PDSCH including the RMSI. For example, the information indicating the time-frequency resource of the PDSCH may indicate the starting position and the length of the PDSCH in the time axis. The UE receiving the PDCCH may identify the position of the PDSCH based on the information indicated by the PDCCH. Here, the size of the PDSCH in the frequency axis may be configured to be equal to the size of the SS/PBCH block or the size of the CORESET in the frequency axis.

Figure 20:
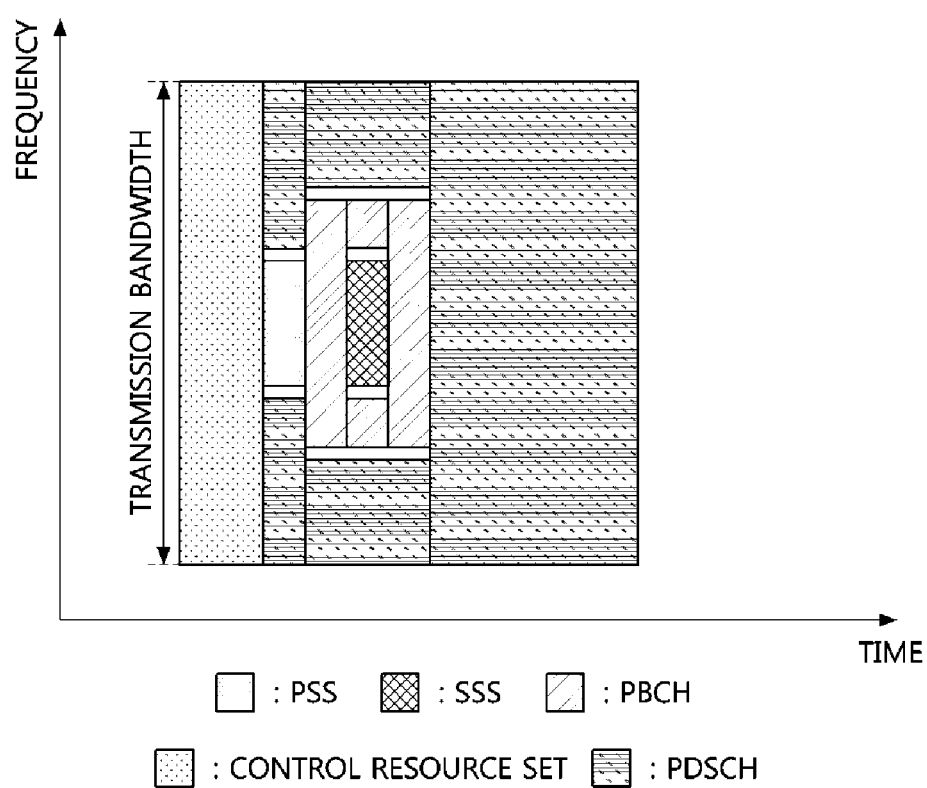
FIG. 20 is a conceptual diagram illustrating a fifth embodiment of a method for transmitting an SS/PBCH block, a PDCCH and a PDSCH in a wireless communication network.

FIG. 20 is a conceptual diagram illustrating a fifth embodiment of a method for transmitting an SS/PBCH block, a PDCCH and a PDSCH in a wireless communication network.

Referring to FIG. 20, RMSI may be transmitted through a PDSCH, a PDCCH including scheduling information for the PDSCH through which the RMSI is transmitted may be transmitted within a CORESET, and configuration information of the CORESET may be transmitted through an SS/PBCH block. The CORESET may be multiplexed with the SS/PBCH block in the time axis. The PDSCH including the RMSI may be multiplexed with the SS/PBCH block in the time and frequency axes.

The length and size of the CORESET in the time and frequency axes may be determined independently of the length and size of the SS/PBCH block in the time and frequency axes, and the length and size of the PDSCH in the time and frequency axes may be determined independently of the length and size of the SS/PBCH block in the time and frequency axes. The size of the PDSCH in the frequency axis may be configured to be equal to the size of the CORESET in the frequency axis. The size of the CORESET may be referred to as a transmission bandwidth. The transmission bandwidth may be less than or equal to a minimum operation bandwidth required for the UE. When the SS/PBCH block, the CORESET, and the PDSCH are multiplexed, the multiplexed signal may be transmitted using the same beam.

The SS/PBCH block may include configuration information of the CORESET. For example, the configuration information of the CORESET may indicate the starting position and the length of the CORESET in the time axis. Also, the configuration information of the CORESET may indicate at least one of the starting position, the center position, and the size of the CORESET in the frequency axis. The UE receiving the SS/PBCH block may identify the position of the CORESET based on the configuration information of the CORESET, which is included in the SS/PBCH block.

The PDCCH transmitted in the CORESET may include information indicating time-frequency resources of the PDSCH including the RMSI. For example, the information indicating the time-frequency resources of the PDSCH may indicate the starting position and the length of the PDSCH in the time axis. The UE receiving the PDCCH may identify the position of the PDSCH based on the information indicated by the PDCCH. Here, the size of the PDSCH in the frequency axis may be configured to be equal to the size of the size of the CORESET in the frequency axis.

Meanwhile, multiplexing types of the SS/PBCH block, the CORESET, and the PDSCH in the embodiments shown in FIGS. 16 to 20 may be defined as shown in Table 1 below.

TABLE 1

| Multiplexing format | Scheme |
|---|---|
| #0 | CORESET is multiplexed with SS/PBCH block in the frequency axis<br>PDSCH is multiplexed with SS/PBCH block in the frequency axis |
| #1 | CORESET is multiplexed with SS/PBCH block in the time axis<br>PDSCH is multiplexed with SS/PBCH block in the frequency axis |
| #2 | CORESET is multiplexed with SS/PBCH block in the frequency axis<br>PDSCH is multiplexed with SS/PBCH block in the time axis |
| #3 | CORESET is multiplexed with SS/PBCH block in the time axis<br>PDSCH is multiplexed with SS/PBCH block in the time axis |
| #4 | CORESET is multiplexed with SS/PBCH block in the time and frequency axes<br>PDSCH is multiplexed with SS/PBCH block in the frequency axis |
| #5 | CORESET is multiplexed with SS/PBCH block in the frequency axis<br>PDSCH is multiplexed with SS/PBCH block in the time andfrequency axes |
| #6 | CORESET is multiplexed with SS/PBCH block in the time and frequency axes<br>PDSCH is multiplexed with SS/PBCH block in the time axis |
| #7 | CORESET is multiplexed with SS/PBCH block in the time axis<br>PDSCH is multiplexed with SS/PBCH block in the time and frequency axes |
| #8 | CORESET is multiplexed with SS/PBCH block in the time and frequency axes<br>PDSCH is multiplexed with SS/PBCH block in the time and frequency axes |

For example, the multiplexing format #0 may indicate the multiplexing type of SS/PBCH block, CORESET, and PDSCH shown in FIG. 16 or 17, the multiplexing format #1 may indicate the multiplexing type of SS/PBCH block, CORESET, and PDSCH shown in FIG. 18, the multiplexing format #3 may indicate the multiplexing type of SS/PBCH block, CORESET, and PDSCH shown in FIG. 19, and the multiplexing format #7 may indicate the multiplexing type of SS/PBCH block, CORESET, and PDSCH shown in FIG. 20.

In this case, the base station may transmit information indicating a multiplexing format through an SS/PBCH block, an upper layer message, or a control channel. The UEs within the cell of the base station may identify the multiplexing format based on the SS/PBCH block, the upper layer message, or the control channel, and may determine that the SS/PBCH block, the CORESET, and the PDSCH are multiplexed according to the multiplexing format. For example, when it is confirmed that the multiplexing format #0 is used by the SS/PBCH block, the upper layer message, or the control channel, the UE may determine that the CORESET and the PDSCH are multiplexed with the SS/PBCH block in the frequency axis.

Upon receiving the SS/PBCH block indicating the multiplexing format, the UE may estimate the position of the CORESET based on the multiplexing format. Alternatively, the UE may estimate the position of the CORESET based on the multiplexing format and the configuration information of the CORESET included in the SS/PBCH block. In this case, the configuration information of the CORESET may include an offset (e.g., frequency offset, time offset) between the CORESET and the SS/PBCH block, the length of the CORESET in the time axis, the size of the COREST in the frequency axis, and the like.

The UE may obtain the PDCCH by performing a monitoring operation on the estimated CORESET. The UE may estimate the position of the PDSCH based on the multiplexing format and configuration information of the PDSCH included in the PDCCH. In this case, the configuration information of the PDSCH may include an offset (e.g., frequency offset, time offset) from the PDCCH to the PDSCH, the length of the PDSCH in the time axis, and the size of the PDSCH in the frequency axis. Alternatively, the UE may estimate the position of the PDSCH based on the multiplexing format. The UE may receive the PDSCH at the estimated position and may identify the RMSI included in the PDSCH.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a user equipment (UE) in a communication system, the operation method comprising:
identifying minimum system information included in a synchronization signal/physical broadcast channel (SS/PBCH) block received from a base station;
receiving a physical downlink control channel (PDCCH) in a control resource set indicated by the minimum system information;
identifying a time-frequency resource through which a physical downlink shared channel (PDSCH) including remaining minimum system information (RMSI) is transmitted based on scheduling information included in the PDCCH; and
obtaining the RMSI from the PDSCH received in the time-frequency resource,
wherein the minimum system information includes an index of a starting symbol of the control resource set in time axis and information indicating a subcarrier spacing applied to each of the PDCCH and the PDSCH.

2. The operation method according to claim 1, wherein the minimum system information further includes information indicating a length of the control resource set in time axis, and the length of the control resource set corresponds to a length of one symbol, two symbols, or three symbols.

3. The operation method according to claim 1, wherein the minimum system information further includes information indicating a size of the control resource set in frequency axis and an offset between a reference position and a starting position of the control resource set in frequency axis.

4. The operation method according to claim 3, wherein each of the size and the offset of the control resource set in the frequency axis is configured in units of resource block (RB).

5. The operation method according to claim 1, wherein the PDCCH is configured according to an aggregation level of control channel element (CCE), and the PDCCH includes one or more CCEs.

6. The operation method according to claim 1, wherein the PDCCH includes one or more control channel elements (CCEs), and a starting CCE among the one or more CCEs included in the PDCCH is configured differently for each UE belonging to a cell of the base station.

7. The operation method according to claim 1, wherein the control resource set is multiplexed with the SS/PBCH block in frequency axis, the PDSCH is multiplexed with the SS/PBCH block in frequency axis, and a sum of a length of the control resource set and a length of the PDSCH in time axis is equal to a length of the SS/PBCH block in time axis.

8. The operation method according to claim 7, wherein a starting position of the control resource set in time axis is equal to a starting position of the SS/PBCH block in time axis, and an ending position of the PDSCH in time axis is equal to an ending position of the SS/PBCH block in time axis.

9. The operation method according to claim 1, wherein the control resource set is multiplexed with the SS/PBCH block in time axis, the PDSCH is multiplexed with the SS/PBCH block in frequency axis, and a length of the PDSCH in time axis is equal to a length of the SS/PBCH block in time axis.

10. The operation method according to claim 1, wherein the control resource set is multiplexed with the SS/PBCH block in time axis, and the PDSCH is multiplexed with the SS/PBCH block in time axis.

11. An operation method of a base station in a communication system, the operation method comprising:

generating a physical downlink shared channel (PDSCH) including remaining minimum system information (RMSI);

generating a physical downlink control channel (PDCCH) including scheduling information for the PDSCH;

generating a synchronization signal/physical broadcast channel (SS/PBCH) block including minimum system information indicating a control resource set through which the PDCCH is transmitted; and transmitting the SS/PBCH block, the PDCCH, and the PDSCH, wherein the minimum system information includes an index of a starting symbol of the control resource set in time axis and information indicating a subcarrier spacing applied to each of the PDCCH and the PDSCH.

12. The operation method according to claim 11, wherein the minimum system information further includes information indicating a length of the control resource set in time axis, and the length of the control resource set corresponds to a length of one symbol, two symbols, or three symbols.

13. The operation method according to claim 11, wherein the minimum system information further includes information indicating a size of the control resource set in frequency axis and an offset between a reference position and a starting position of the control resource set in frequency axis.

14. The operation method according to claim 11, wherein the PDCCH is configured according to an aggregation level of control channel element (CCE), and the PDCCH includes one or more CCEs.

15. The operation method according to claim 11, wherein the control resource set is multiplexed with the SS/PBCH block in frequency axis, the PDSCH is multiplexed with the SS/PBCH block in frequency axis, and a sum of a length of the control resource set and a length of the PDSCH in time axis is equal to a length of the SS/PBCH block in time axis.

16. The operation method according to claim 15, wherein a starting position of the control resource set in time axis is equal to a starting position of the SS/PBCH block in time axis, and an ending position of the PDSCH in time axis is equal to an ending position of the SS/PBCH block in time axis.

17. The operation method according to claim 11, wherein the control resource set is multiplexed with the SS/PBCH block in time axis, the PDSCH is multiplexed with the SS/PBCH block in frequency axis, and a length of the PDSCH in time axis is equal to a length of the SS/PBCH block in time axis.

18. The operation method according to claim 11, wherein the control resource set is multiplexed with the SS/PBCH block in time axis, and the PDSCH is multiplexed with the SS/PBCH block in time axis.

* * * * *